(12) United States Patent
Masuda et al.

(10) Patent No.: US 9,042,079 B2
(45) Date of Patent: May 26, 2015

(54) CERAMIC ELECTRONIC COMPONENT

(71) Applicant: TDK Corporation, Tokyo (JP)

(72) Inventors: Sunao Masuda, Tokyo (JP); Katsumi Kobayashi, Tokyo (JP); Akitoshi Yoshii, Tokyo (JP); Kazuyuki Hasebe, Nikaho (JP); Takashi Komatsu, Nikaho (JP); Kayou Kusano, Nikaho (JP)

(73) Assignee: TDK CORPORATION, Tokyo (JP)

( * ) Notice: Subject to any disclaimer, the term of this patent is extended or adjusted under 35 U.S.C. 154(b) by 82 days.

(21) Appl. No.: 13/973,514

(22) Filed: Aug. 22, 2013

(65) Prior Publication Data

US 2014/0055910 A1 Feb. 27, 2014

(30) Foreign Application Priority Data

Jan. 28, 2013 (JP) ................................ 2013-013054
May 10, 2013 (JP) ................................ 2013-100626

(51) Int. Cl.
| | |
|---|---|
| *H01G 4/228* | (2006.01) |
| *H01G 4/01* | (2006.01) |
| *H01G 4/30* | (2006.01) |
| *H01G 4/38* | (2006.01) |
| *H01G 2/06* | (2006.01) |
| *H01G 4/232* | (2006.01) |

(52) U.S. Cl.
CPC . *H01G 4/01* (2013.01); *H01G 4/30* (2013.01); *H01G 4/38* (2013.01); *H01G 2/06* (2013.01); *H01G 4/232* (2013.01)

(58) Field of Classification Search
USPC ................ 361/306.3, 301.2, 301.4, 303–305, 361/306.1, 311–313, 321.1, 321.2
See application file for complete search history.

(56) References Cited

U.S. PATENT DOCUMENTS

| | | | | |
|---|---|---|---|---|
| 6,297,942 | B1 * | 10/2001 | Azuma et al. ................. | 361/307 |
| 6,381,117 | B1 * | 4/2002 | Nakagawa et al. ......... | 361/306.3 |
| 7,005,106 | B2 * | 2/2006 | Izumida et al. ............... | 420/560 |
| 7,139,160 | B2 * | 11/2006 | Hidaka et al. .............. | 361/301.3 |
| 8,446,705 | B2 * | 5/2013 | Ritter et al. ................ | 361/301.4 |
| 2007/0188975 | A1 * | 8/2007 | Togashi et al. ............. | 361/306.3 |
| 2009/0296311 | A1 * | 12/2009 | Otsuka et al. ............. | 361/306.3 |

FOREIGN PATENT DOCUMENTS

| | | |
|---|---|---|
| JP | 2000-235932 A | 8/2000 |
| JP | 2000-306764 A | 11/2000 |

* cited by examiner

*Primary Examiner* — Nguyen T Ha
(74) *Attorney, Agent, or Firm* — Arent Fox LLP

(57) ABSTRACT

A ceramic electronic component comprising; including a chip component of approximately rectangular parallelepiped, a first metal terminal portion having a first flat plate portion facing a first end face, at least a pair of first fitting arm portions connected to the first flat plate portion, having a first engagement projection engaging with a first wraparound portion holding the first wraparound portion in between, and a first mounting portion connected to the first flat plate portion and extending approximately parallel to one side face, and a second metal terminal portion having a second flat plate portion facing the second end face, at least a pair of second fitting arm portions connected to the second flat plate portion, having a second engagement projection engaging with a second wraparound portion, holding the second wraparound portion in between, and a second mounting portion extending approximately parallel to one side face.

21 Claims, 33 Drawing Sheets

(a)

(b)

(c)

(d)

(a)

(b)

(c)

(d)

CERAMIC ELECTRONIC COMPONENT

BACKGROUND OF THE INVENTION

1. Field of the Invention

The present invention relates to a ceramic electronic component comprising a chip component and metal terminals attached therewith.

2. Background Art

As for the ceramic electronic component such as a ceramic capacitor or so, besides the usual chip component which is directly and singularly face mounted to the substrate or so, the chip component attached with the metal terminals are proposed. The ceramic electronic component attached with the metal terminals is reported to have an effect to weaken the deforming stress to the chip component from the substrate, or to protect the chip component from the impact or so; and it is being used in the field wherein a durability and the reliability are needed.

In the conventional ceramic electronic component using the metal terminals, the terminal electrodes of the chip component and the metal terminals are bonded via a solder or so (refer to JP-A No. 2000-306764, JP-A No. 2000-235932 or so). By bonding the terminal electrodes and the metal terminals by solder or so, the electrical connection between the chip component and the terminal electrodes are ensured, and the metal terminals can be attached to the chip component.

SUMMARY OF THE INVENTION

The Problem to be Solved by the Invention

However, in the conventional ceramic electronic component in which the metal terminals and the chip component are bonded by the solder or so, in order to prevent the breaking of the bonding between the metal terminals and the chip component during the mounting step, it is necessary to use the high temperature solder for the bonding between the metal terminals and the chip component; and it still has problem from the point of suppressing the material with environmental burden. Also, in the conventional ceramic electronic component comprising the metal terminals, it took time for the production since the solder bonding step was necessary during the production, and also it had a problem from the point of cost.

The present invention was accomplished in view of such situation, and the object is to provide a ceramic electronic component having high reliability, and having metal terminals which can be produced easily and the attachment structure for the chip component.

Means for Solving the Problems

In order to solve the above objects, the ceramic electronic component according to the present invention comprises;

a chip component of approximately rectangular parallelepiped shape having a first terminal electrode formed so that it wraps around a part of side faces from a first end face, and a second terminal electrode formed so that it wraps around other part of said side faces from a second end face opposing said first end face, a first metal terminal portion having a first flat plate portion facing said first end face, at least a pair of first fitting arm portions connected to said first flat plate portion, formed with a first engagement projection engaging with a first wraparound portion which is a part of said first terminal electrode and positioned at said side face of said chip component, and a pair of said first fitting arm portions holding said first wraparound portion in between and a first mounting portion connected to said first flat plate portion and extending approximately parallel to either one of said side face by taking predetermined space in between said chip component, and a second metal terminal portion having a second flat plate portion facing said second end face, at least a pair of second fitting arm portions connected to said second flat plate portion, formed with a second engagement projection engaging with a second wraparound portion which is a part of said second terminal electrode and positioned at said side face of said chip component, and a pair of said second fitting arm portions holding said second wraparound portion in between, and a second mounting portion connected to said second flat plate portion and extending approximately parallel to either one of said side face by taking predetermined space in between said chip component.

In regards with the ceramic electronic component according to the present invention, the first metal terminal portion and the second metal terminal portions respectively comprises the fitting arm portions, and the fitting arm portions holds the terminal electrodes of the chip component by having the wraparound portion in between, thereby the first metal terminal portion, the second metal terminal portions and the chip component are assembled. Also, at the fitting arm portion, the engagement projections which engage with the wraparound portion of the terminal electrodes are formed, and due to the fitting arm portion having such engagement projections, the first and the second metal terminal portion and the chip component are fixed so that it does not fall off from each other.

As such, in the ceramic electronic component according to the present invention, the fitting arm portion holds the terminal electrodes of the chip component; thereby the metal terminal portions and the chip component are fixed; thus due to the heat transferred to the joint portion when mounting said ceramic electronic component, there is no risk that the fixed metal terminal portion and the chip component from coming off. Further, on the contrary to the conventional art, in the present invention, there is no need to use the high temperature solder for the bonding of the metal terminal portions and the chip component, thus the use of the material having environmental burden can be suppressed.

Also, the ceramic electronic component according to the first aspect of the present invention holds the chip component by the resilient force of the metal terminal, hence unlike the conventional art, the problems would not occur such as the breaking of the connection of the chip component caused by the difference between the linear expansion coefficient of the solder or so as the joint material and the linear expansion coefficient of the metal terminal portion; hence it has a high reliability against the change of the temperature environment. Further, it is relatively free to select the material of the metal terminal portions, thus it is advantageous from the point of the cost and the performance.

Also for example, said first fitting arm portion may face one of said side face of said chip component, wherein said side face is positioned approximately perpendicular to said first mounting portion, and said second fitting arm portion may face one of said side face of said chip component, wherein said side face is positioned approximately perpendicular to said second mounting portion.

The fitting arm portion have the structure to hold the side face of the perpendicular direction of the chip component, thereby in case of holding plurality of chip components being stacked up, each chip component can be held one by one, thus a stable supporting structure can be accomplished. Also, in case of holding the chip component in a way that the stacking direction of the chip component is perpendicular with respect to the first and the second mounting portions, the arm portion holds the direction having relatively lesser size variation of the chip component; thereby the bonding force between the chip component and the metal terminals are suppressed from varying.

Also, for example, said first fitting arm portion may face one of said side face of said chip component, wherein said side face is approximately parallel against said first mounting portion a, and said second fitting arm portion may face one of said side face of said chip component, wherein said side face is approximately parallel against said second mounting portion.

The fitting arm portion has a structure which holds the side faces of the horizontal direction of the chip component; thereby the weight of the chip component can be supported further stably. Also, in case the chip component is held in a direction wherein the stacking direction of the chip component is parallel with respect to the first and the second mounting portion, the arm portion hold the direction having relatively lesser size variation in the chip component, thereby the bonding force between the chip component and the metal terminals are suppressed from varying.

Further, for example, the ceramic electronic component according to the present invention may comprise at least two pairs of said first fitting arm portions wherein one pair of said two pairs of said first fitting arm portions may face one of said side face of said chip component, wherein said side face is positioned approximately perpendicular to said first mounting portion, and another pair of said first fitting arm portions may face one of said side face of said chip component, wherein said side face is positioned approximately parallel against said first mounting portion, and further, the ceramic electronic component of the present invention may comprise at least two pairs of said second fitting arm portions wherein one pair of said two pairs of said second fitting arm portions which may face one of said side face of said chip component, wherein said side face is positioned approximately perpendicular to said second mounting portion, and another pair of said second fitting arm portion which may face one of said side face of said chip component, wherein said side face is positioned approximately parallel against said second mounting portion.

As the ceramic electronic component comprises both the fitting arm which holds the side faces of the perpendicular direction of the chip component, and the fitting arm which hold side faces of the horizontal direction of the chip component, such ceramic electronic component enhances the connection force between the chip component and the metal terminal portions, and ensures a high reliability.

Also, for example, said first engagement projection may have higher projection height or wider projection width towards said first flat plate portion from a projection end portion of said first engagement projection, and a second engagement projection may have higher projection height or wider projection width towards said second flat plate portion from a projection end portion of said second engagement projection.

The first engagement projection and the second engagement projection has a shape which becomes larger towards the each flat plate portion, thereby the fitting arm is prevented from falling off from the chip component, and such ceramic electronic component exhibit high impact resistance.

Also, for example, the first terminal electrode and the second terminal electrode of said chip component may comprise the metal plating layer coating the surface.

By coating the terminal electrodes by the metal plating layer, such ceramic electronic component has improved moisture resistance or so for the part of the chip component.

Also, said first engagement projection of said first fitting arm portion and said second engagement projection of said second fitting arm portion may comprise the metal plating layer coating the outer most surface.

By covering the engagement projections which engages with the terminal electrodes by the metal plating layer, the electrical bonding between the terminal electrodes and the metal terminals of the chip component are improved.

Also, said first engagement projection and said first wraparound portion, and also said second engagement projection and said second wraparound portion may be welded via said metal plating layer.

By welding the engagement projections and the wraparound portions of the terminal electrodes, the electrical bonding between the terminal electrodes and the metal terminals are improved, and also the physical connection between the chip component and the metal terminals can be reinforced.

Also, for example, the main component of the material of said first metal terminal portion and said second metal terminal portion may be phosphor bronze.

By having phosphor bronze as the material of the metal terminal portion, the specific resistance of the metal terminal portion can be reduced and the Equivalent Series Resistance (ESR) of the entire capacitor can be reduced.

Also, for example, the surface of said chip component side of said first mounting portion and said second mounting portion may have lower wettability against the solder than the surface of said first mounting portion and said second mounting portion of the opposite side against said chip component.

In regards with the surface of the chip component side of the mounting portion, by carrying out the treatment to lower the wettability against the solder, the solder during the mounting is prevented from wrapping around the chip component side, and allows preventing the space between the chip component and the mounting portion from becoming small. Thereby, the resilient deformation of the metal terminal is prevented from over suppressed by the solder or so, and effectively suppresses the squealing noise caused by transferring the vibration of the chip component to the mounting substrate or so.

For example, at said first flat plate portion, the first projection portion which is in contact with said first end face by projecting out towards said first end face may be formed, and at said second flat plate portion, the second projection portion which is in contact with said second end face by projecting towards said second end face may be formed.

Due to the first projection portion and the second projection portion, as the contact area between the chip component and the terminal electrodes is reduced, thus such ceramic electronic component can effectively suppress the squealing noise which is caused by transferring the vibration generated at the chip component to the terminal electrodes via the substrate or so.

Also, for example, the ceramic electronic component according to the present invention, may comprise a first stopper portion which is connected to said first flat plate portion, positioned approximately perpendicular to said first fitting arm portion and in contact with one of said side face of said chip component, and a second stopper portion which is connected to said second flat plate portion, positioned approximately perpendicular to said second fitting arm portion and in contact with one of said side face of said chip component.

The metal terminal comprising the stopper portion allows carrying out easy positioning of the metal terminal and the chip component when assembling the metal terminals and the chip component, thus ceramic capacitor comprising such metal terminals can be easily produced.

Also, said first stopper portion may oppose said side face of said chip component with respect to said first mounting portion, and said second stopper portion may be oppose said side face of said chip component with respect to said second mounting portion.

If the height is the same, by proving the stopper portion so that it faces the upper face of the chip component rather than the lower face, it allows the easy positioning of the metal terminals and the chip component, while ensuring to enlarge the space between the chip component and the mounting portion, and enables to securely prevent the squealing noise.

Also, for example, said first stopper portion may face against said side face of said chip component facing said first mounting portion side, and said second stopper portion may face said side face of said chip component facing said second mounting portion side.

By providing the stopper portion so that it faces the lower face of the chip component, even if the force towards the downward direction is applied to the chip component, the chip component can be securely prevented from falling off from the metal terminals.

Also, for example, the first through hole may be formed at said first flat plate portion, and said stopper portion may be connected to said first flat plate portion at the edge portion of said first through hole, and a second through hole may be formed at said second flat plate portion, and said second stopper portion may be connected to said second flat plate portion at the edge portion of said second through hole.

The through hole is formed at the flat plate portion, and has a constitution of which the stopper portion connects with the flat plate portion at the edge portion of the through hole; thereby even in case the metal terminals comprises the stopper portion connecting other than the end portion of the flat plate, it can be easily produced by just bending the plate material of the flat plate shape. Therefore, such ceramic electronic component can be produced easily, and also it can comprise the stopper portion connecting to arbitrary position of the flat plate portion, hence it is highly free to design.

Also, for example, said first metal terminal portion and second metal terminal portion may be produced by mechanical processing the plate material of flat plate shape.

The metal terminals produced by mechanical processing the plate material have simple structure, and the ceramic capacitor using such metal terminals ensures the necessary strength while reducing the cost.

The ceramic electronic component according to the second aspect of the present invention comprises;

a chip component of approximately rectangular parallelepiped shape having a first terminal electrode formed so that it wraps around a part of side faces from a first end face, and a second terminal electrode formed so that it wraps around other part of said side faces from a second end face opposing said first end face, a first metal terminal portion having a first flat plate portion facing said first end face, at least a pair of first fitting arm portions connected to said first flat plate portion, formed with a first engagement projection engaging with a first wraparound portion which is a part of said first terminal electrode and positioned at said side face of said chip component, and a pair of said first fitting arm portions holding said first wraparound portion in between, and a first mounting portion connected to said first flat plate portion and extending approximately parallel to either one of said side face by taking predetermined space in between said chip component, a first adhesive agent joint portion connecting said first flat plate portion and said first end face, a second metal terminal portion having a second flat plate portion facing said second end face, at least a pair of second fitting arm portions connected to said second flat plate portion, formed with a second engagement projection engaging with a second wraparound portion which is a part of said second terminal electrode and positioned at said side face of said chip component, and a pair of said first fitting arm portion holding said second wraparound portion in between, and a second mounting portion connected to said second flat plate portion and extending approximately parallel to either one of said side face by taking predetermined space in between said chip component, and a second adhesive agent joint portion connecting said second flat plate portion and said second end face.

In addition to the effect of the ceramic electronic component as set forth in the first aspect of the present invention, the ceramic electronic component according to the second aspect of the present invention can enhance the adhered strength between the chip component and the metal terminal portions by connecting the end face of the chip component and the flat plate portion of the metal terminal portions with the first adhesive agent joint portion and the second adhesive agent joint portion. In this case, the conductivity between the chip component and the metal terminal portions are ensured by the fitting arm portion comprising the engagement projection; hence as the adhesive agent constituting the first and the second adhesive agent joint portion, arbitrary adhesive agent which can enhance the adhered strength between the chip component and the metal terminal portion can be selected. The ceramic electronic component according to the present invention ensures the conductivity with the metal terminal portions by holding the chip component with the fitting arm portion comprising the engagement projections, and also has suitable reliability against the impact or the deformation force from the outside since the first and the second adhesive agent joint portion takes the structure reinforcing the connection between the chip component and the metal terminal portions. Also, unlike the conventional art which ensures the mechanical bonding force by the solder, the ceramic electronic component according to the present invention can reduce the problem of the connection of the chip component being broke due to the difference between the linear expansion coefficient of the connecting material such as solder or so and the liner expansion coefficient of the metal terminal portion; thus the present invention has high reliability against the change of the temperature atmosphere. Also, the material of the metal terminal portions or the adhesive agent joint portion can be selected relatively freely, thus it is advantageous from the point of the cost and the performance.

Also, for example, the adhesive agent constituting said first adhesive agent joint portion and said second adhesive gent joint portion may be non-conductive adhesive agent.

The adhesive agent constituting said first and second adhesive agent joint portion is not particularly limited; however by using the non-conductive adhesive agent, the adhered strength between the chip component and the metal terminal portions can be enhanced. By using the non-conductive adhesive agent constituted by the resin or so, a higher adhesiveness can be obtained compared to the conductive adhesive agent including the conductive component such as metal filler or so. Note that, as for the non-conductive adhesive agent, for example, the heat curing resin such as an epoxy resin, a phenol resin or so may be used.

Also, for example, at a connection part of said first flat plate portion with said first adhesive agent joint portion and the connection part of said second flat plate portion with said second adhesive agent joint portion, an area having higher adhesiveness against the adhesive agent constituting said first adhesive agent joint portion and said second adhesive agent joint portion than a metal plating layer provided to said first fitting arm portion and said second fitting arm portion may be formed.

By forming the area having higher adhesiveness against the adhesive agent than the metal plating area at the connection part between the flat plate portion and the adhesive agent joint portion, the adhered strength between the chip component and the metal terminal portion can be enhanced.

The metal terminal comprising the stopper portion allows to easily carrying out the positioning of the metal terminals and the chip component when assembling the metal terminals comprising the stopper portion, hence the ceramic capacitor comprising such metal terminal is easily produced.

The ceramic electronic component according to the third aspect of the present invention comprises;
a chip component of approximately rectangular parallelepiped shape having a first terminal electrode formed so that it wraps around a part of side faces from a first end face, and a second terminal electrode formed so that it wraps around other part of said side faces from a second end face which opposing said first end face,
a first metal terminal portion having a first flat plate portion facing said first end face, at least a pair of first fitting arm portions connected to said first flat plate portion and holding a pair of said side faces of said chip component in between, and a first mounting portion connected to said first flat plate portion and extending approximately parallel to either one of said side face by taking predetermined space in between said chip component,
a second metal terminal portion having a second flat plate portion facing said second end face, at least a pair of second fitting arm portions connected to said second flat plate portion and holding a pair of said side faces of said chip component in between, and a second mounting portion connected to said second flat plate portion and extending approximately parallel to either one of said side face by taking predetermined space in between said chip component, wherein
plurality of first inner convex portions projecting out towards said chip component is formed at a first arm inner side which is a face facing said chip component in said first fitting arm portion and at least a part of said first inner convex portions is engaging with said first terminal electrode, and
plurality of second inner convex portions projecting out towards said chip component is formed at a second arm inner side which is a face facing said chip component in said first fitting arm portion and at least a part of said second inner convex portions is engaging with said second terminal electrode.

In the ceramic electronic component according to the third aspect of the present invention, plurality of inner convex portions wherein at least part thereof engaging with the terminal electrode are formed at the arm inner face of the fitting arm portion; and due to the fitting arm portion comprising such inner convex portion, the first and second metal terminal portions and the chip component are fixed so that it does not fall off from each other.

As such, in addition to the effect according to the first aspect of the present invention, in the ceramic electronic component according to the third aspect of the present invention, the fitting arm portion can suitably exhibit the force of holding the chip component even in when the shape of the chip component, particularly the shape of the terminal electrodes of the chip component varies by forming plurality of inner convex portions at the arm inner face; and the conductivity can be ensured by securely engaging the terminal electrode and at least one inner convex portions.

Also, for example, plurality of first outer convex portions projecting out towards an opposite direction against said chip component may be formed at a first arm outer side opposing said first arm inner side of said first fitting arm portion, and
plurality of second outer convex portions projecting out towards an opposite direction against said chip component may be formed at a second arm outer side opposing said second arm inner side of said second fitting arm portion.

By forming the outer side convex portions at the arm outer face of the fitting arm portion, the heat dissipating characteristic of the metal terminal portions can be improved, and the temperature rising of the chip component can be suppressed. Note that, the method for forming the inner convex portions and the outer convex portions are not particularly limited; however the fitting arm portion comprising said convex and concave can be produced by pressing the metal mold having the convex and concave shape from the inner face side and the outer face side at the part corresponding to the fitting arm portion of before forming the convex and concave. The fitting arm part produced as such will have the concave portion at the arm outer face at the back side of the portion of which the inner side convex portion is formed; and the back side of which the outer side convex portion is formed at the arm outer face will be the concave part of the arm inner face; thereby a convex and concave shape are formed at the arm inner face and the arm outer face. Such fitting arm portion has excellent heat dissipating characteristic in order to increase the surface area.

Also, for example, a first convex alignment portion may be formed, which is constituted by plurality of said first inner convex portions, by aligning along a third direction being the perpendicular direction to a first direction which is a direction towards said second end face from said first end face, and to a second direction which is a sandwiching direction of said first fitting arm portion, and
a second convex alignment portion may be formed, which is constituted by plurality of said second inner convex portion, by aligning along a fifth direction being a perpendicular direction to said first direction and a fourth direction which is a sandwiching direction of said second fitting arm portion.

The fitting arm portion formed with the convex alignment portion wherein plurality of inner convex portions are aligned along the third direction or the fifth direction can securely hold the chip component by bringing plurality of inner convex portions into contact with the side face of the chip component at the appropriate position.

Also, for example, plurality of said first convex alignment portions may be formed at said first arm inner side along said first direction, and plurality of said second convex alignment portions may be formed at said second arm inner side along said first direction.

The fitting arm portion of which plurality of convex alignment portions are formed along the first direction can securely hold the chip component even when the wraparound amount to the side face of the terminal electrodes varies due to the production variation; and also enables to ensure the conductivity by securely engaging at least part of the inner side convex portion and the terminal electrode.

For example, one of said first inner convex portions included in said first convex alignment portions may be different position of said third direction with respect to other said first inner convex portions included in adjacent said first convex alignment portions, and said second inner convex portions included in said second convex alignment portions may be different position of said fifth direction with respect to said second inner convex portions included in adjacent said second convex alignment portion.

By forming the inner side convex portion by shifting the position of the third direction or the fifth direction, it becomes possible to form many convex portions within a predetermined area, thus such fitting arm portion securely holds the chip component and securely engages the inner side convex portion and the terminal electrodes.

Also, for example plurality of said first inner convex portion may be formed at said first arm inner side having different distance to closest other said first inner convex portion, and plurality of said second inner convex portion may be formed at said second arm inner side having different distance to closest other said second inner convex portion.

The inner side convex portion may be formed periodically at the arm inner face; however the arrangement of the inner convex portion may have irregular spacing which includes plurality of the inner convex portions having different distance to the other closest inner convex portion. The arrangement of the inner convex portion can take periodic or irregular arrangement so that secure conductivity and suitable holding force can be obtained by taking the variation trend of the terminal electrode shape into consideration.

DETAILED DESCRIPTION OF THE INVENTION

Hereinbelow, the embodiment of the present invention will be described based on the figures.

The First Embodiment

Figure 1:
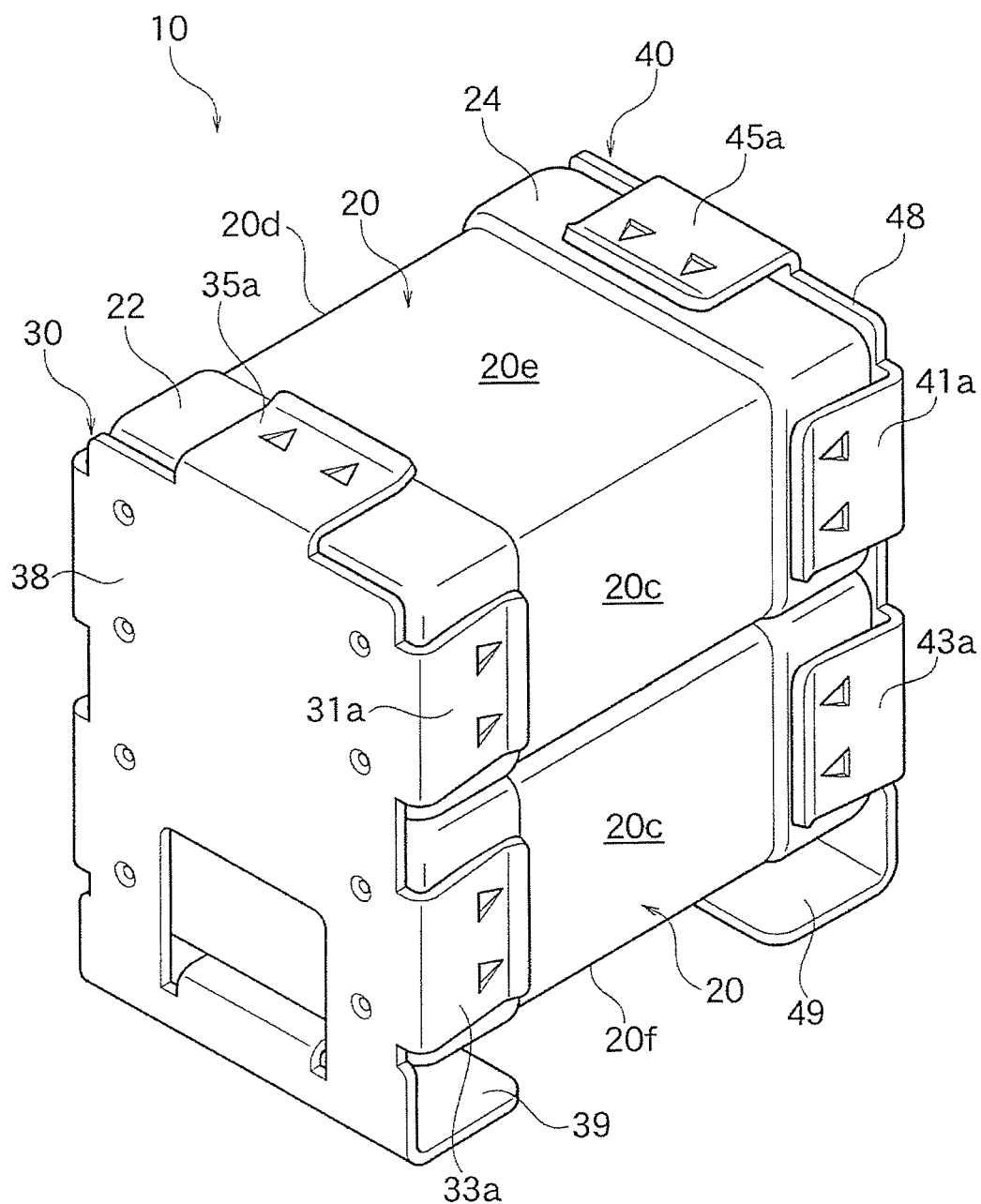
FIG. 1 shows the schematic perspective view of the ceramic electronic component according to the first embodiment of the present invention.

FIG. 1 is a schematic perspective view showing the ceramic capacitor 10 according to the first embodiment of the present invention. The ceramic capacitor 10 comprises two chip capacitors 20, and the first metal terminal portion 30 and the second metal terminal portion 40 attached to the chip capacitor 20. Note that, in the explanation of each embodiment, the ceramic capacitor attached with the metal terminal portions 30 and 40 to the chip capacitor 20 will be used as an example for explaining, however the ceramic electronic component of the present invention is not to be limited thereto; and the metal terminal portions 30 and 40 may be attached to the chip component other than the capacitor.

Figure 7:
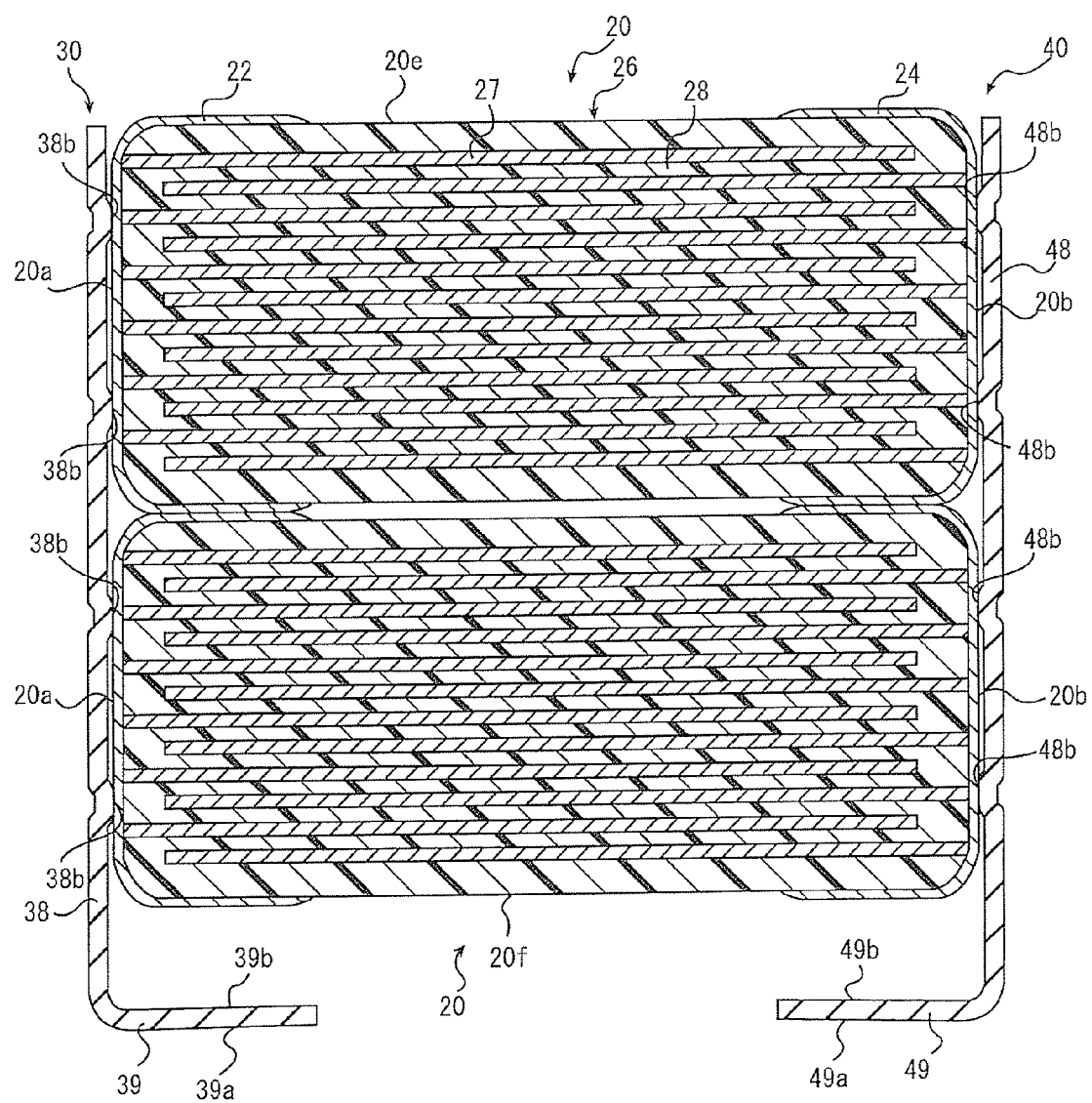
FIG. 7 is a schematic perspective view of the ceramic electronic component shown in FIG. 1.

FIG. 7 is a cross section of the ceramic capacitor 10 shown in FIG. 1, and particularly the inner structure of the chip capacitor 20 is shown schematically. The chip capacitor 20 comprises the capacitor element 26, the first terminal electrode 22 and the second terminal electrode 24. The capacitor element 26 comprises the dielectric layer 28 as the ceramic layer, and the internal electrode 27; and the dielectric layer 28 and the internal electrode layer 27 are stacked in an alternating manner.

The internal electrode layer 27 has those connected to the first terminal electrode 22, and those connected to the second terminal electrode 24. The internal electrode layer 27 connecting to the first terminal electrode 22 and the internal electrode layer 27 connecting to the second terminal electrode 24 are stacked in an alternating manner via the dielectric layer 28 in between.

The material of the dielectric layer 28 is not particularly limited, and for example it is constituted by the dielectric material such as calcium titanate, strontium titanate, barium titanate or the mixture thereof. The thickness of each dielectric layer 28 is not particularly limited; however in general it is several μm to several hundred μm. In the present embodiment, it is preferably 1.0 to 5.0 μm.

The conductive material included in the internal electrode layer 27 is not particularly limited; however in case the constituting material of the dielectric layer 28 has the reduction resistance, a base metal which is relatively inexpensive can be used. As for the base metal, Ni or Ni alloy or so is preferable. As for Ni alloy, the alloy between Ni and one or more selected from Mn, Cr, Co, and Al is preferable; and the content of Ni in the alloy is preferably 95 wt % or more. Note that, in Ni or Ni alloy, 0.1 wt % or less or so of various trace components such as P or so may be included. Also, the internal electrode layer 27 may be formed by using the commercially available electrode paste. The thickness of the internal electrode layer 27 may be determined accordingly depending on the use.

The material of the terminal electrodes 22 and 24 are not particularly limited, and usually copper or copper alloy, nickel or nickel alloy or so are used, however silver or alloy of silver and palladium or so can be used. The thickness of the terminal electrodes 22 and 24 are not particularly limited however usually it is 10 to 50 μm or so. Note that, at the surface of the terminal electrodes 22 and 24, the metal coating layer selected from at least one of the group consisting of Ni, Cu, Sn or so may be formed.

The shape or the size of the chip capacitor 20 may be determined accordingly depending on the purpose or the use. When the chip capacitor 20 is a rectangular parallelepiped shape, usually it is the length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

As shown in FIG. 1, the ceramic capacitor 10 comprises two chip capacitors 20. The two chip capacitors 20 have approximately the same shape. Note that, the number of the chip capacitor 20 which the ceramic capacitor 10 have may be one, or it may be three or more; and in case of having plurality of chip capacitors 20, each shape may be different.

The chip capacitor 20 has approximately rectangular parallelepiped shape constituted by six faces of a first end face 20a, a second end face 20b, a first side face 20c, a second side face 20d, a third side face 20e, and a fourth side face 20f. As shown in FIG. 7, the first side face 20a faces the first flat plate portion 38 of the first metal terminal portion 30; and the second end face 20b is parallel to the first end face 20a, which opposes with respect to the first end face 20a, and faces the second flat plate portion 48 of the second metal terminal portion 40.

The chip capacitor 20 comprises four side faces 20c to 20f connecting the first end face 20a and the second end face 20b. Among the four side faces 20c to 20f, the first side face 20c and the second side face 20d are parallel against each other and facing the opposite direction (refer to FIG. 4); and the third side face 20e and the fourth side face 20f are parallel against each other and facing the opposite direction (refer to FIG. 2).

Among the four side faces 20c to 20f of the chip capacitor 20, the first side face 20c and the second side face 20d are arranged approximately perpendicular with respect to the first mounting portion 39 of the first metal terminal portion 30 and the second mounting portion 49 of the second metal terminal portion 40. On the contrary to this, the third side face 20e and the fourth side face 20f are arranged approximately parallel with respect to the first mounting portion 39 of the first metal terminal portion 30 and the second mounting portion 49 of the second metal terminal portion 40. Further, the third side face 20e is opposing the first and the second mounting portion 39 and 49; and the fourth side face 20f facing towards the side of the first and the second mounting portions 39 and 49.

As shown in FIG. 1 and FIG. 7, the first terminal electrode 22 of the chip capacitor 20 is formed so that it wraps around a part of the side faces 20c to 20f from the first end face 20a. Therefore, the first terminal electrode 22 comprises the part arranged at the first end face 20a, and the first wraparound portions 22c to 22f arranged at the first side face 20c to fourth side face 20f (refer to FIG. 1 to FIG. 5).

Also, the second terminal electrode 24 of the chip capacitor 20 is formed so that it wraps around another part of the side faces 20c to 20f from the second end face 20b. Therefore, the second terminal electrode 24 comprises the part arranged at the second end face 20b, and the second wraparound portions 24c to 24f arranged at the first side face 20c to the fourth side face 20f (refer to FIG. 1 to FIG. 5).

As shown in FIG. 1, the first metal terminal portion 30 and the second metal terminal portion 40 are attached to the both ends of the chip capacitor 20, and two chip capacitors 20 are stacked on against each other, and held by metal terminal portions 30 and 40. The first metal terminal portion 30 comprises the first flat plate portion 38, the first fitting arm portions 31a, 31b, 33a, 33b, 35a, 35b connecting to the first flat plate portion 38, and the first mounting portion 39 connecting to the same first flat plate portion 38 (refer to FIG. 1 to FIG. 5).

The first flat plate portion 38 of the first metal terminal portion 30 is facing the first end face 20a of the chip capacitor 20. As shown in FIG. 7, at the first flat plate portion 38, the first projection portion 38b contacting with the first end face 20a by projecting out towards the first end face 20a is formed. The first projection portion 38b reduces the contacting area between the first flat plate portion 38 and the first end face 20a, thereby has an effect to suppress the vibration of the chip capacitor 20 to be transferred to the first metal terminal portion 30.

The first metal terminal portion 30 comprises the three pairs of the first fitting arm portions 31a, 31b, 33a, 33b, 35a, 35b which hold the first terminal electrode 22 of the chip capacitor 20 in between. A pair of the first fitting arm portion 31*a* and 31*b* holds the first wraparound portions 22*c* and 22*d* of the first terminal electrode 22 of the chip capacitor 20 at upper side by placing in between. Also, other pair of the first fitting arm portions 33*a* and 33*b* holds first wraparound portions 22*c* and 22*d* of the first terminal electrode 22 of the chip capacitor 20 at lower side by placing in between (refer to FIG. 3). Further, other pair of the first fitting arm portions 35*a* and 35*b* holds the first wraparound portion 22*e* of the first terminal electrode 22 at the upper side chip capacitor 20, and the first wraparound portion 22*f* of the first terminal electrode 22 at the lower side chip capacitor 20 by placing in between (refer to FIG. 2).

Figure 2:
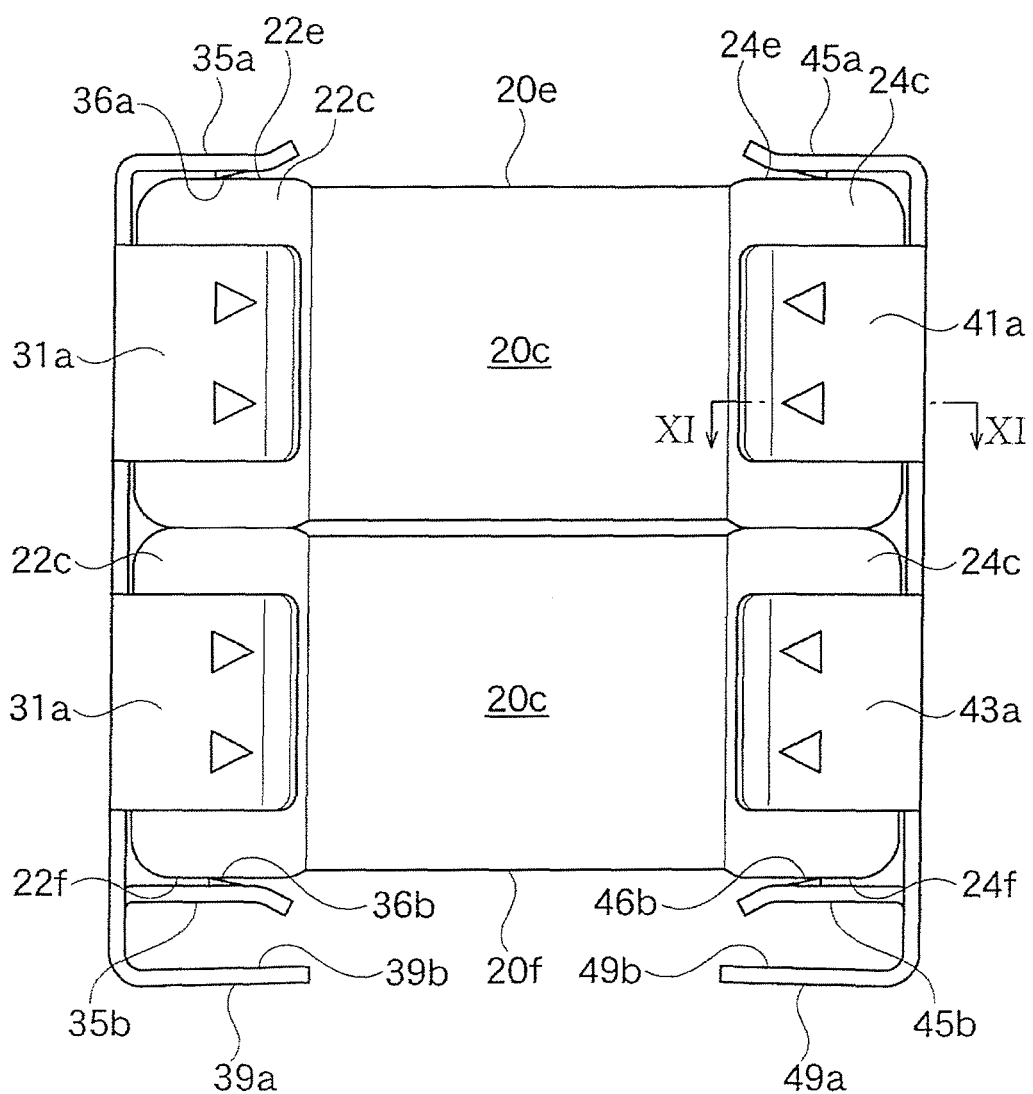
FIG. 2 is a front view of the ceramic electronic component shown in FIG. 1.
Figure 3:
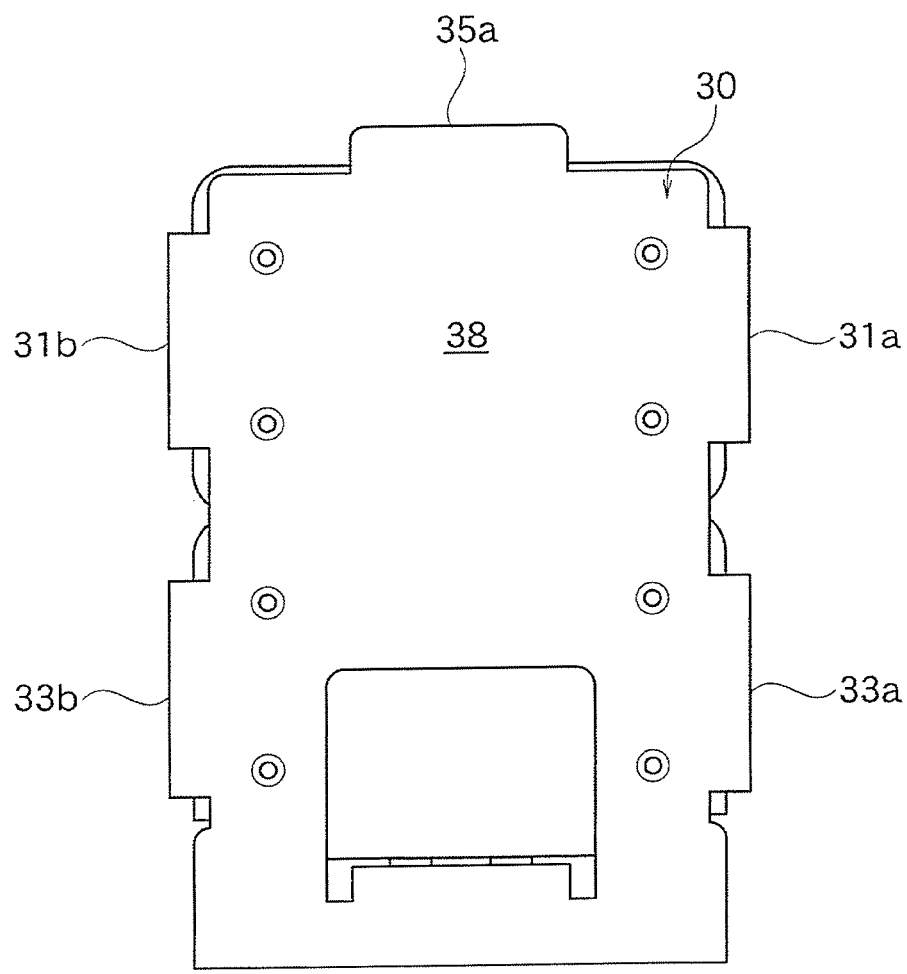
FIG. 3 is a left side view of the ceramic electronic component shown in FIG. 1.

The first fitting arm portions 31*a*, 31*b*, and the first fitting arm portions 33*a*, 33*b* are facing the side faces 20*c*, 20*d* arranged approximately perpendicular to the first mounting portion 39, among the side faces 20*c* to 20*f* of the chip capacitor 20 (refer to FIG. 3). On the contrary, the first fitting arm portions 35*a*, 35*b* are facing the side faces 20*e* and 20*f* arranged approximately parallel to the first mounting portion 39, among the side faces 20*c* to 20*f* of the chip capacitor 20 (refer to FIG. 2 and FIG. 4).

At the first fitting arms 31*a*, 31*b*, 33*a*, 33*b*, 35*a*, 35*b*, the first engagement projection engaging with the first wraparound portions 22*c* to 22*f* of the first terminal electrode 22 are formed (refer to first engagement projections 36*a*, 36*b* or so (FIG. 2) formed at the first fitting arm portions 35*a*, 35*b*). Note that, the first metal terminal portion 30 is symmetrically arranged to the second metal terminal portion 40 with respect to the chip capacitor 20; however regarding the shape, it is the same as the second metal terminal portion 40. Therefore, the detailed structure of the first fitting arm portions 31*a*, 31*b*, 33*a*, 33*b*, 35*a*, 35*b* will be explained using the second metal terminal portion 40 and the explanation of the first metal terminal portion 30 will be omitted.

As shown in FIG. 1 and FIG. 2, the first mounting portion 39 of the first metal terminal portion 30 is extending approximately parallel to the fourth side face 20*f* of the chip capacitor 20. Also, the first mounting portion 39 is arranged by taking a predetermined space in between from the fourth side face 20*f* of the lower side of the chip capacitor 20. The first mounting portion 39 is a part which is bonded to the substrate by the solder or so when mounting the ceramic capacitor 10 to the substrate or so; and the mounting portion bottom face 39*a* which is the surface opposite of the chip capacitor 20 of the first mounting portion 39 (refer to FIG. 2) is placed so that it faces the substrate which is the subject to be mounted. The mounting portion upper face 39*b* which is the surface of the chip capacitor side 20 of the first mounting portion 39 preferably has a lower wettability against the solder, than the mounting portion bottom face 39*a* from the point of preventing the excessive wraparound of the solder.

The second metal terminal portion 40 comprises the second flat plate portion 48, the second fitting arm portions 41*a*, 41*b*, 43*a*, 43*b*, 45*a*, 45*b* which connects to the second flat plate portion 48, and the second mounting portion 49 connecting to the same second flat plate portion 48. The second flat plate portion 48 of the second metal terminal portion 40 faces the first end face 20*a* of the chip capacitor 20.

Figure 6:
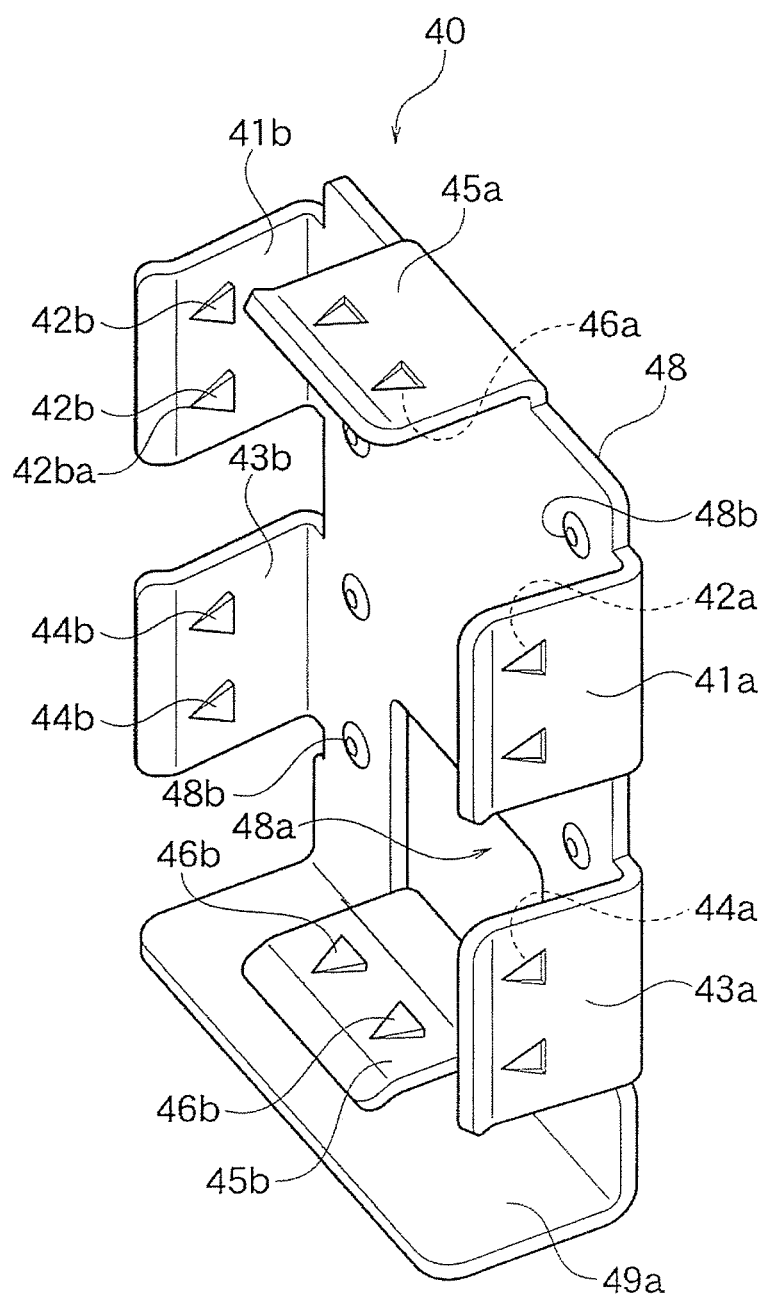
FIG. 6 is a perspective view of the second metal terminal electrode portion included in the ceramic electronic component shown in FIG. 1.

FIG. 6 is a perspective view of the second metal terminal portion 40. As shown in FIG. 6, at the second flat plate portion 48, the second projection portion 48*b* is formed. As shown in FIG. 7, the second projection portion 48*b* contacts with the second end face 20*b* by projecting out towards the second end face 20*b*. As similar to the first projection portion 38*b*, the second projection portion 48*b* has an effect to suppress the vibration of the chip capacitor 20 to be transferred to the second metal terminal portion 40.

As shown in FIG. 1 and FIG. 6, the second metal terminal portion 40 comprises three pairs of second fitting arm portions 41*a*, 41*b*, 43*a*, 43*b*, 45*a*, 45*b* which hold the second terminal electrode 24 of the chip capacitor 20 in between. A pair of the second fitting arm portions 41*a*, 41*b* holds the second wraparound portions 24*c*, 24*d* of the second terminal electrode 24 at the upper side of the chip capacitor 20 in between. Also, other pair of the second fitting arm portions 43*a*, 43*b* holds the second wraparound portions 24*c*, 24*d* of the second terminal electrode 24 at the lower side chip capacitor 20 (refer to FIG. 4 and FIG. 5). Further, other pair of second fitting arm portions 45*a*, 45*b* holds the second wraparound portion 24*e* of the second terminal electrode 24 at the upper side of the chip capacitor 20 and the second wraparound portion 24*f* of the second terminal electrode 24 at the lower side of the chip capacitor 20 in between (refer to FIG. 2).

Figure 4:
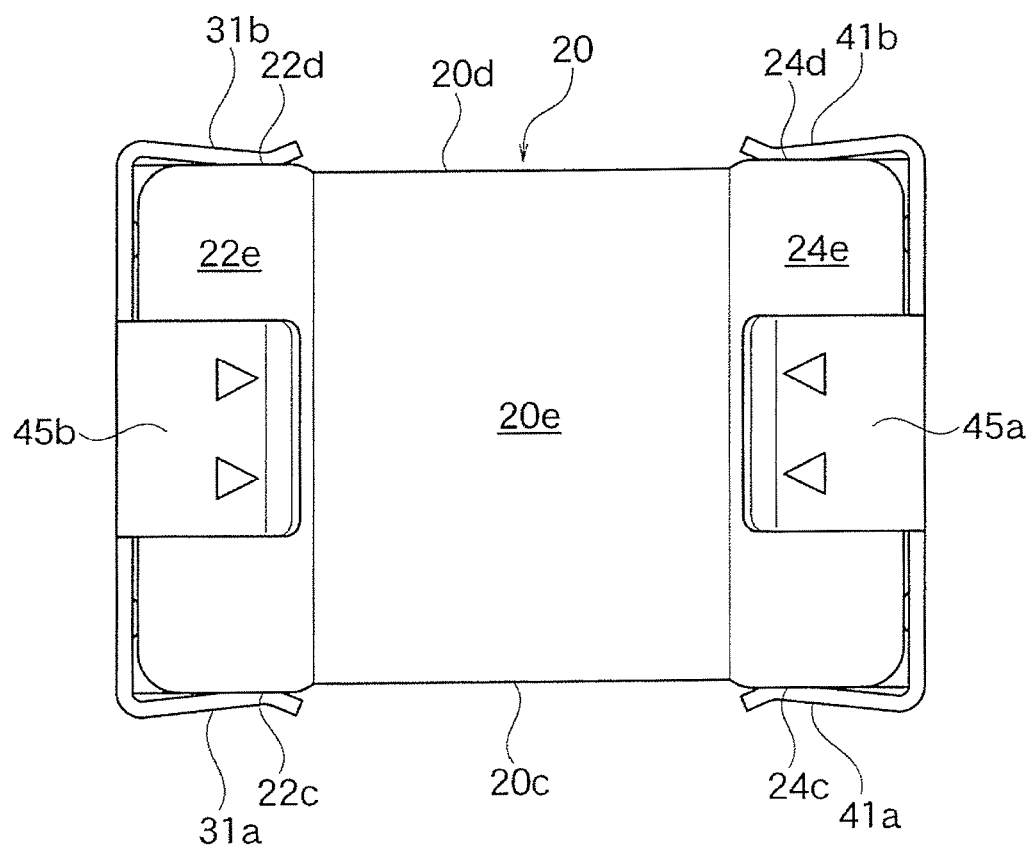
FIG. 4 is an upper view of the ceramic electronic component shown in FIG. 1.
Figure 5:
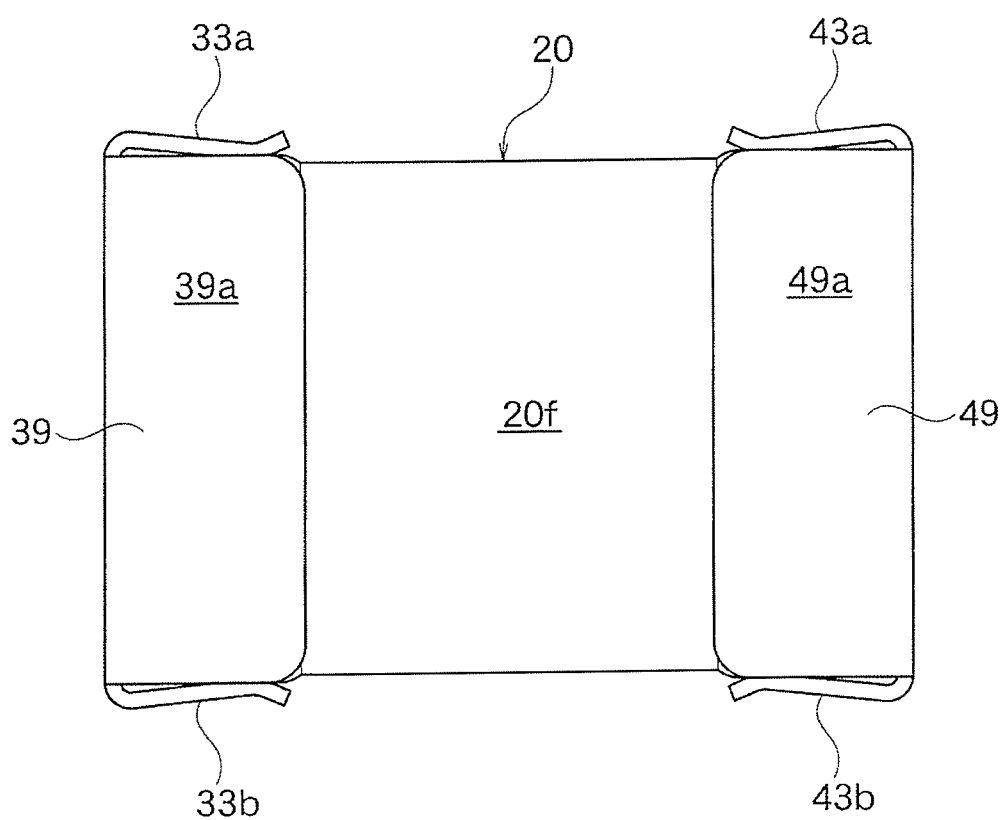
FIG. 5 is a bottom view of the ceramic electronic component shown in FIG. 1.

The second fitting arm portions 41*a*, 41*b*, and the second fitting arm portions 43*a*, 43*b* faces to the side faces 20*c*, 20*d* arranged at approximately perpendicular to the second mounting portion 49, among the side faces 20*c* to 20*f* of the chip capacitor 20 (refer to FIG. 4 or so). On the contrary, the second fitting arm portions 45*a*, 45*b* faces the side faces 20*e*, 20*f* arranged approximately parallel to the second mounting portion 49, among the side faces 20*c* to 20*f* of the chip capacitor 20 (refer to FIG. 2 or so).

As shown in FIG. 6, at each facing face of the second fitting arm portions 41*a*, 41*b*, 43*a*, 43*b*, 45*a*, 45*b*, the second engagement projections 42*b*, 44*b*, 46*b* are formed. In FIG. 6, although it cannot be seen since it is at the backside of other members, the second engagement projections 42*a*, 44*a*, 46*a* are formed also at the second fitting arm portions 41*a*, 43*a*, 45*a*, as similar to the second fitting arm portions 41*b*, 43*b*, 45*b*.

The second engagement projections 42*a*, 42*b*, 44*a*, 44*b*, 46*a*, 46*b* engages with the second wraparound portions 24*c* to 24*f* of the second terminal electrode, and the second metal terminal portion 40 effectively prevents the second terminal electrode 24 from coming off. The shape of the second engagement projections 42*a*, 42*b*, 44*a*, 44*b*, 46*a*, 46*b* are not limited to quadrangular pyramid shape as shown in FIG. 6; and it is not particularly limited as long as the second wraparound portions 24*c* to 24*f* can engage, such as trigonal pyramid shape, partial spherical shape, or a square pillar shape or so.

Note that, for example in case of the second engagement projection 42*b*, the second engagement projection 42*b* preferably has a higher projection height (the length of the direction projecting towards the second wraparound portion 24*d*) towards the flat plate portion 48 from the projection end portion 42*ba* of the engagement projection 42*b*, or the wider width of the projection (the length of the perpendicular direction to the projecting direction towards the second flat plate portion 48 from the projection end portion 42*ba*). By making the shape of the second engagement projections 42*a*, 42*b*, 44*a*, 44*b*, 46*a*, 46*b* so that it becomes larger towards the flat plate portion 48 side from the projection end portion, the second metal terminal portion 40 can be further effectively prevented from coming off from the second terminal electrode 24.

Figure 11:
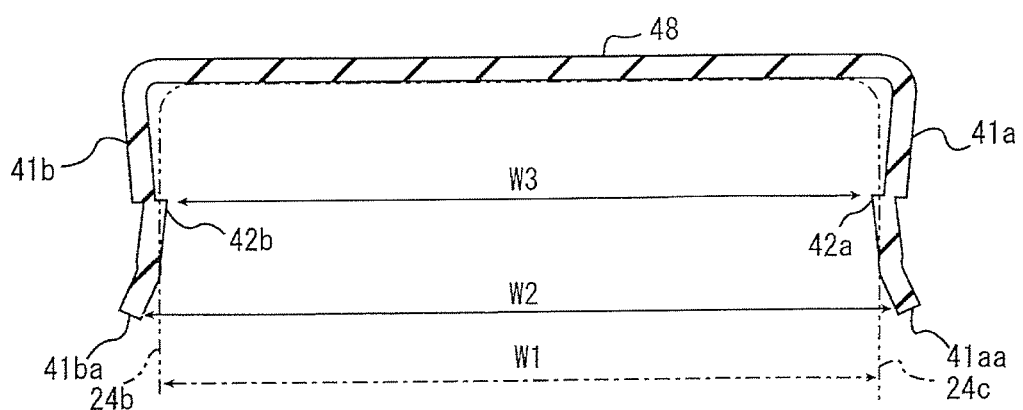
FIG. 11 is a cross section of the second metal terminal.

FIG. 11 is a cross sectional view of the second metal terminal portion 40, and it is formed at the second fitting arm portion 41*a*, 41*b*, further it shows the cross section passing through the two engagement projections 42*a*, 42*b* which faces to each other. When the second metal terminal portion

40 is in a free state (the state of which the chip capacitor 20 is not held), the space W3 from top portion of the second engagement projection 42a to the top portion of the second engagement projection 42b is narrower than the space W1 from the second wraparound portion 24c of the chip capacitor 20 to the second wraparound portion 24d. Therefore, as shown in FIG. 1, when the second terminal electrode 24 of the chip capacitor 20 is inserted between the second fitting arm portion 41a and the second fitting arm portion 41b, the second metal terminal portion 40 deforms resiliently, and the second metal terminal portion 40 can hold the second terminal electrode 24 between the second fitting arm portion 41a and 41b which opposes against each other.

Also, the tip portions 41aa, 41ba of the second fitting arm portions 41a, 41b are bended in a direction which separates against each other so that the second terminal electrode 24 can be smoothly inserted between the second fitting arm portions 41a, 41b. In this case, the space W2 from the tip portion 41 as of the second fitting arm portion 41a to the tip portion 41ba of the second fitting arm portion 41b is preferably wider, even when the second metal terminal portion is in a free state, than the space W1 from the second wraparound portion 24c to the second wraparound portion 24d.

As shown in FIG. 1 and FIG. 2, the second mounting portion 49 of the second metal terminal portion 40 extends approximately parallel to the fourth side face 20f of the chip capacitor 20. As similar to the first mounting portion 39, the second mounting portion 49 is arranged by taking the predetermined space from the fourth side face 20f at the lower side of the chip capacitor 20. From the same reason as the first mounting portion 39, even in case of the second mounting portion 49, the mounting portion upper face 49b preferably has lower wettability against the solder than the mounting portion bottom face 49a.

The material of the first metal end portion 30 and the second metal terminal portion 40 is not particularly limited as long as it is a metal material having the conductivity, and for example iron, nickel, copper, silver or so or the alloy including these can be used. Particularly, by using the phosphor bronze as the material of the first metal terminal portion 30 and the second metal terminal portion 40, the specific resistance of the first and second metal terminal portions 30, 40 is suppressed which is preferable from the point of reducing the ESR of the ceramic capacitor 10.

Hereinbelow, the production method of the ceramic capacitor 10 will be explained.

The Production Method of the Chip Capacitor 20

First, in order to form the green sheet which becomes the dielectric layer 28 after the firing, the green sheet paste is prepared. The green sheet paste in the present embodiment is constituted by the water-based paste or the organic solvent paste obtained by kneading the raw material of the dielectric material and the organic vehicle.

As for the raw material of the dielectric material, various compounds which becomes calcium titanate, strontium titanate, barium titanate after firing may be used; for example it is accordingly selected from carbonates, nitrates, hydroxides, and organic metal compounds, and it may be used by mixing. As for the raw material of the dielectric material, for example those having the powder form with the average particular diameter of 0.2 to 0.5 µm or so can be used; however it is not particularly limited thereto.

The organic vehicle is the organic solvent dissolved with the binder resin. As for the binder resin used for the organic vehicle, it is not particularly limited, and various usual binder resins such as ethyl cellulose, polyvinyl butyral, acrylic resin or so can be exemplified.

Also, the organic solvent used for the organic vehicle is not particularly limited, and usual organic solvents such as alcohol, acetone, methylethyl ketone (MEK), toluene, xylene, ethyl acetate, butyl stearate, terpeniol, butyl carbitol, isobonylacetate or so can be exemplified. Note that, in case the green sheet paste is a water-based paste, for example polyvinyl alcohol which is water soluble can be used as the binder.

Also, in the green sheet paste, the additives selected from various dispersant, plasticizer, anti-static agent, dielectrics, glass frits, and insulator or so may be added depending on the needs.

Next, using the above mentioned green sheet paste; the green sheet was formed on the carrier sheet. The thickness of the green sheet is not particularly limited; however for example it is 2.0 to 7.0 µm or so. The green sheet is dried after formed on the carrier sheet.

Next, on the one side of the green sheet, the electrode pattern is formed which will become the internal electrode layer 27 after firing. As the method for forming the electrode pattern, it is not particularly limited; however, a printing method, a transfer method, a thin film method or so can be mentioned as examples. After forming the electrode pattern on the green sheet, the green sheet formed with the electrode pattern is obtained by drying.

The internal electrode layer paste is prepared by kneading the conductive material comprising various conductive metals or the alloy or so, various oxides which becomes the above mentioned conductive material by firing, the organic metal compound, resinate or so, and the organic vehicle.

As the conductive material used by producing the internal electrode layer paste, Ni or Ni alloy, and the mixture thereof are preferably used. The shape of such conductive material is not particularly limited, and it may be spherical shape, scale shape or so; also these shapes may be mixed as well.

The organic vehicle comprises the binder resin and the organic solvent as similar to the green sheet paste. As for the binder resin, for example, ethyl cellulose, acrylic resin, polyvinyl butyral, polyvinyl acetal, polyvinyl alcohol, polyolefin, polyurethane, polystyrene or so, and the copolymers thereof or so may be exemplified.

Also, as the solvent, for example, terpineol, butylcarbitol, kerosene or so which are known can be used. In the internal electrode layer paste, the additives selected from various dispersants, plasticizers, anti-static agents, dielectrics, glass frits, and insulators or so may be added depending on the needs.

Next, the green sheet formed with the internal electrode pattern is layered till it reaches the desired numbers of layers by releasing from the carrier sheet, thereby the green sheet multilayered body is obtained. Note that, at the first and the last layer, the outer layer green sheet without the internal electrode pattern is stacked.

Then, this green multilayered body is carried out with the final pressure applying. The pressure of the final pressure applying is preferably 10 to 200 MPa. Also, the heating temperature is preferably 40 to 100° C. Further, the multilayered body is cut into a predetermined size, thereby the green chip is obtained. The obtained green chip is carried out with the heat treatment (the solidification drying). The condition of the heat treatment is not particularly limited, however under the reduced atmosphere; it can be 140 to 180° C., and 2 to 10 hours.

Next, after the heat treatment, the green chip is carried out with the polishing. The polishing method is not particularly limited; and although it may be dry method or wet method, for example the wet barrel polishing can be used as well.

The binder removing treatment is carried out after the polishing. The condition of the binder removal treatment is not particularly limited, however for example, it may be under the air or nitrogen atmosphere, the temperature rising speed of 5 to 300° C./hour, the holding temperature of 200 to 400° C., and temperature holding time of 0.5 to 20 hours.

Then, the firing of the green chip is carried out. The condition of the firing is not particularly limited, and for example, it can be under the reduced atmosphere, the temperature rising speed of 50 to 500° C., the holding temperature of 1000 to 1400° C., the temperature holding time of 0.5 to 8 hours, and the cooling temperature of 50 to 500° C. After the firing, by carrying out the annealing treatment and the polishing or so depending on the needs, the capacitor element 26 shown in FIG. 7 is obtained.

Finally, the first terminal electrode 22 and the second terminal electrode 24 are formed to the capacitor element 26. The terminal electrodes 22 and 24 are produced for example by forming the base electrode by printing the terminal electrode paste, then forming the metal coating by plating the surface of the base electrode. Note that, the terminal electrode paste is prepared as similar to the above mentioned internal electrode layer paste; and the firing condition of the terminal electrode paste is for example under the mixed gas of wetted $N_2$ and $H_2$, at 600 to 800° C. for 10 minutes to 1 hour or so.

The Production Method of the First Metal Terminal Portion 30 and the Second Metal Terminal Portion 40

Figure 10:
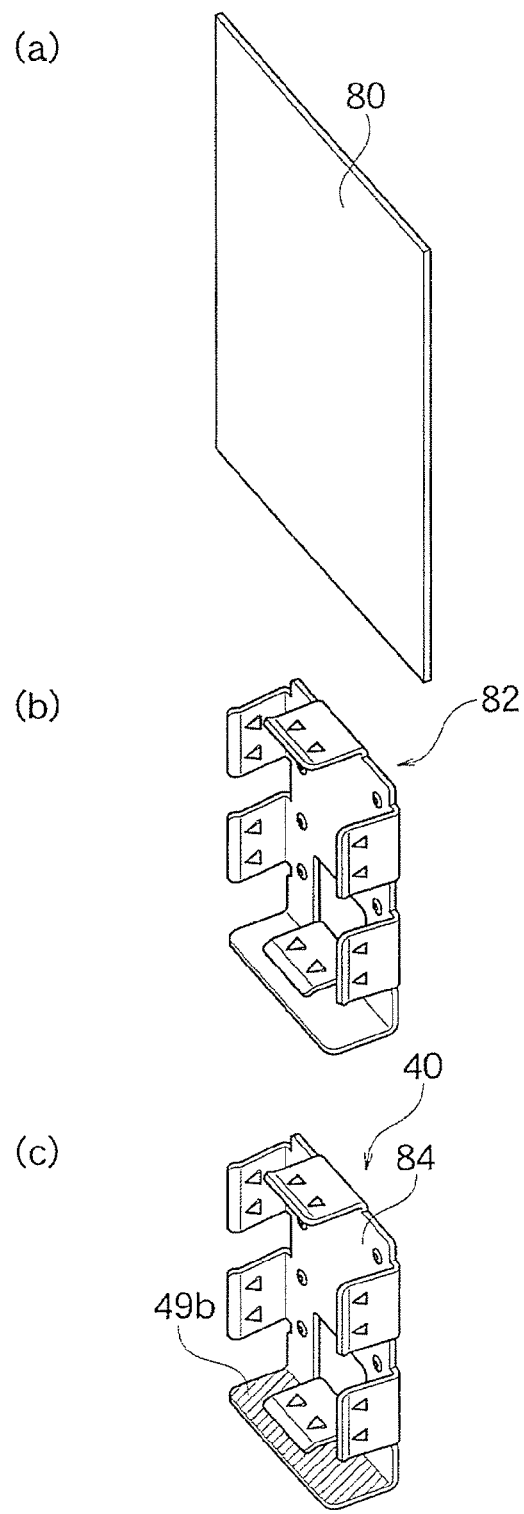
FIG. 10 is a conceptual diagram showing the production method of the second metal terminal portion included in the ceramic electronic component.

During the production of the first metal terminal portion 30 and the second metal terminal portion 40, first, the metal board material 80 of flat plate shape is prepared as shown in FIG. 10(*a*). The material of the metal board material 80 is not particularly limited as long as it is a metal material with the conductivity, and for example iron, nickel, copper, silver or so and the alloy including these can be used. Note that, the first metal terminal portion 30 and the second metal terminal portion 40 can be produced by the same production method, therefore the second metal terminal portion 40 will be used as the example to explain.

Next, by carrying out the mechanical processing to the metal board material 80, the intermediate part 82 is obtained (FIG. 10(*b*)). The specific processing method is not particularly limited, and for example by using the pressure processing, cutting processing or so, the shape of the second flat plate portion 48, the second fitting arm portions 41*a*, 41*b*, 43*a*, 43*b*, 45*a*, 45*b*, the second engagement projections 42*a*, 42*b*, 44*a*, 44*b*, 46*a*, 46*b*, and the second mounting portion 49 or so are formed from the metal board material 80. Note that, as shown in FIG. 6, in case the second metal terminal portion 40 has the second fitting arm portion 45*a*, 45*b* arranged approximately parallel to the second mounting portion 49, the second fitting arm portion 35*b* of the close to the second mounting portion 49 connects to the second flat plate portion 48 at the edge portion of the second through hole 48*a* formed at the second flat plate portion 48. By doing so, by just carrying out the mechanical processing to the metal board plate 80, the shape of the second mounting portion 49, the second metal terminal portion 40 comprising a pair of the second fitting arm portions 45*a*, 45*b* which is approximately parallel to the second mounting portion 49 can be formed easily.

Next, on the surface of the intermediate part 82, the metal coating 84 by plating is formed; thereby the second metal terminal portion 40 is obtained (FIG. 10 (*c*)). As for the material used for the plating, it is not particularly limited, however for example Ni, Sn, Cu or so may be mentioned. Also, during the plating treatment, by carrying out the resist treatment to the mounting portion upper face 49*b* of the second mounting portion 49, the plating can be prevented from attaching to the mounting portion upper face 49*b*. Thereby, the wettability against the solder can be made different between the mounting portion upper face 49*b* and the mounting portion bottom face 49*a*. Note that, after forming the metal coating 84 by carrying out the plating treatment to entire intermediate part 82 by removing only the metal coating formed on the mounting portion upper face 49*b* using the laser releasing, the same difference can be produced.

The Assembling of the Ceramic Capacitor 10

Two chip capacitors 20 obtained as mentioned in above is prepared, then while being held by stacking as shown in FIG. 1, the first metal terminal portion 30 and the second metal terminal portion 40 are attached to the first terminal electrode 22 and the second terminal electrode 24 respectively, and the ceramic capacitor 1 is obtained. As shown in FIG. 11, the tip (the tip portions 41*aa*, 41*ba*) of each fitting arm portion of the metal terminal portion 30 and 40 are bent so that it is separates apart against each other, hence by just brining each end faces 20*a*, 20*b* of the chip capacitor 20, and the flat plate portions 38, 48 of the metal terminal portions 30, 40, the terminal electrode 22 and 24 can be embedded between the pair of the fitting arm portions 31*a*, 31*b*, 41*a*, 41*b* or so.

Note that, after attaching the first and second metal terminal portion 30, 40 to the chip capacitor 20, depending on the needs, the wraparound portions 22*c* to 22*f*, 24*c* to 24*f* of the terminal electrodes 22, 24, and the engagement projections 36*a*, 36*b*, 42*a*, 42*b*, 44*a*, 44*b*, 46*a*, 46*b* engaging therewith can be welded by melting the metal plating formed on at least one side of the surface. Thereby, electric bonding between the terminal electrodes 22, 24 and the metal terminal portions 30, 40 are improved, and also the physical connection between the chip capacitor 20 and the metal terminal portions 30, 40 can be reinforced.

As such, for the ceramic capacity 10, the first and the second metal terminal portions 30, 40 comprises the fitting arm portions 31*a*, 31*b*, 33*a*, 33*b*, 35*a*, 35*b*, 41*a*, 41*b*, 43*a*, 43*b*, 45*a*, 45*b*; and the wraparound portions 22*a* to 22*f*, 24*c* to 24*f* of the chip capacitor 20 is held in between the fitting arm portions. Therefore, the ceramic capacitor 10 can be easily assembled, and the production is easy. Also, even in case of being used at high temperature environment or under the environmental having large temperature difference, the ceramic capacitor 10 has no risk of breaking the bond between the chip capacitor 20 and the metal terminal portions 30, 40 due to the difference between heat expansion rate between the bonding material and the metal terminal portions 30, 40, unlike the conventional art using the bonding material as the solder or so.

Also, the ceramic capacitor 10 has a structure holding the chip capacitor 20 by the fitting arm portions 31*a*, 31*b*, 41*a*, 41*b* or so; thus the contacting area between the chip capacitor 20 and the metal terminal portions 30, 40 can be reduced while ensuring the good conductivity. Thereby, the ceramic capacitor 10 can prevent the phenomena of the squealing noise which is caused by the vibration due to the electrostriction generated in the chip capacitor 20 and transferred to the mounting substrate or so through the metal terminal portions 30, 40.

As shown in FIG. 1, the ceramic capacitor 10 comprises the fitting arm portions 31*a*, 31*b*, 41*a*, 41*b* or so holding the chip capacitor 20 from the parallel direction with respect to the mounting portions 39, 40, and the fitting arm portions 35*a*, 35*b*, 45*a*, 45*b* holding the chip capacitor 20 from the perpendicular direction with respect to the mounting portion 39, 40. As such, the ceramic capacitor 10 can hold the chip capacitor 20 from both of the parallel direction and the perpendicular direction with respect to the mounting portions 39, 40; therefore has excellent impact resistance and high reliability.

The Second to Seventh Embodiment

Figure 8:
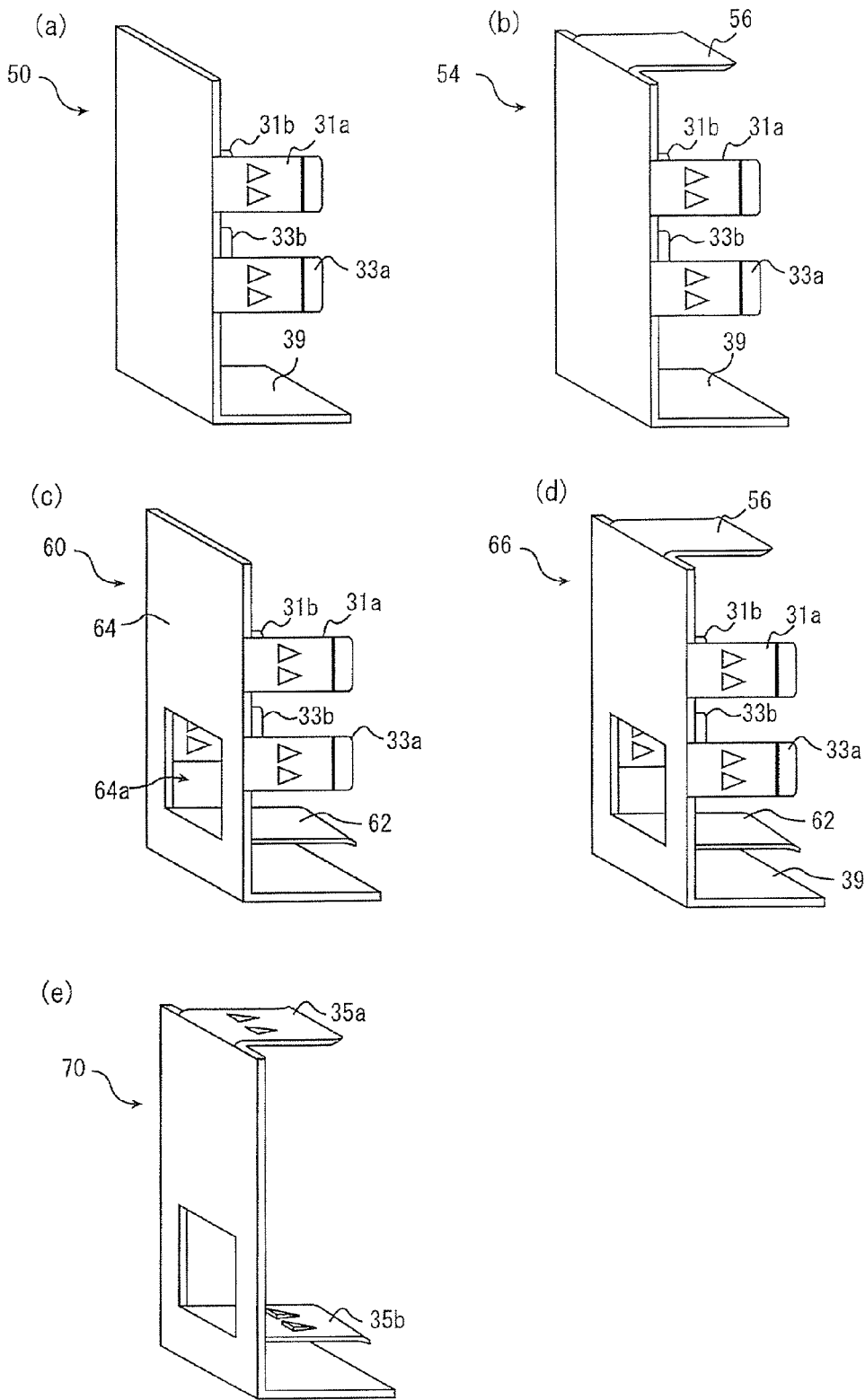
FIG. 8 is a conceptual diagram showing the shape of the first metal terminal portion included in the ceramic electronic component according to the second to sixth embodiments of the present invention.

The metal terminal attached to the chip capacitor 20 is not limited to the shape shown in the first embodiment, and it can be variously modified depending on the use of the ceramic capacitor. FIG. 8 is a conceptual diagram showing the first metal terminal used for the ceramic capacitor according to the second to sixth embodiment of the present invention. Note that, the ceramic capacitor according to the second to sixth embodiments are the same as the ceramic capacitor 10 according to the first embodiment except for the constitution of the first and the second metal terminal, and the shape of the first metal terminals and the second metal terminal are the same as well, hence the explanation except for the first metal terminal will be omitted.

FIG. 8(a) shows the first metal terminal portion 50 included in the ceramic capacitor according to the second embodiment of the present invention. The first metal terminal portion 50 comprises the first fitting arm portions 31a, 31b, 33a, 33b facing the side faces 20c, 20d arranged approximately perpendicular to the first mounting portion 39, among the side face of the chip capacitor 20. However, the first metal terminal portion 50 does not comprise the fitting arm portion holding the side face parallel with respect to the first mounting portion 39, unlike the first metal terminal portion 30 according to the first embodiment.

Here, the multilayered electronic component such as the chip capacitor 20 easily causes the size variation in the stacking direction of the dielectric layer 28 and the internal electrode layer 27 (refer to FIG. 7), and for other directions, the size variation is less than the stacking direction. As shown in FIG. 7, in case the stacking direction of the chip capacitor 20 is perpendicular direction with respect to the first mounting portion 39, as the first metal terminal portion 50 shown in FIG. 8(a), the holding force of the first fitting arm portions 31a, 31b can be stabilized than holding the chip capacitor 20 from the parallel direction with respect to the first mounting portion 39.

The first metal terminal portion 50 shown in FIG. 8(a) can also hold the chip capacitor 20 stably by controlling the thickness of the metal board material 80 used for the production (refer to FIG. 10), and exhibits the effect similar to the first metal terminal portion 30 according to the first embodiment. Also, the first metal terminal portion 50 has lesser contact points with the chip capacitor 20 than the first metal terminal electrode portion 30 according to the first embodiment, thus it is advantageous from the point of preventing the squealing noise.

FIG. 8(b) shows the first metal terminal portion 54 included in the ceramic capacitor according to the third embodiment of the present invention. The first metal terminal portion 54 is different from the first metal terminal portion 50 shown in FIG. 8(a) as the first metal terminal portion 54 comprises the first stopper portion 56, but it is the same for rest of the constitution as the first metal terminal portion 50. The first stopper portion 56 is arranged approximately perpendicular with respect to the first fitting arm portions 31a, 31b, and faces the third side face 20e of the chip capacitor 20.

The first stopper portion 56 does not form a pair as the first fitting arm portions 31a, 31b, and also the engagement projection is not formed at the first stopper portion 56. However, the first metal terminal portion 54 comprising the first stopper portion 56 brings the first stopper portion 56 and the third side face 20e into contact when assembling the chip capacitor 20 and the first metal terminal portion 50, thereby the positioning can be carried out easily. Note that, the second metal terminal used as a pair with the first metal terminal portion 54 also comprises the second stopper portion as similar to the first metal terminal portion 54.

FIG. 8(c) shows the first metal terminal portion 60 included the ceramic capacitor according to the fourth embodiment of the present invention. The first metal portion 60 is different from the first metal terminal portion 50 shown in FIG. 8(a) in a point comprising the first stopper portion 62, but it is the same for the rest of the constitutions as the first metal terminal portion 50. The stopper portion 62 is arranged approximately perpendicular with respect to the first fitting arm portions 31a, 31b or so, and faces the fourth side face 20f facing the first mounting portion 39 side, among the side faces of the chip capacitor 20.

At the first flat plate portion 64 of the first metal terminal portion 60, the first though hole 64a is formed, and the first stopper portion 62 connects with the first flat plate portion 64 at the edge portion of the first through hole 64a. The first metal terminal portion comprising such first stopper portion 62 can be easily produced by simply processing the metal board material 80 as shown in FIG. 10. Also, at the first stopper portion 62, the engagement projection is not formed as similar to the first stopper portion 56 of the first metal terminal portion 54 according to the third embodiment. However, the first stopper portion 62 is not only advantageous for the positioning during the assembling, but also enables to support the chip capacitor 20 after assembling; hence the ceramic capacitor comprising the first metal terminal portion 60 has excellent durability. Note that, the second metal terminal used as a pair with the first metal terminal portion 60 comprises the second flat plate portion formed with the second through hole, and the second stopper portion, as similar to the first metal terminal portion 60.

FIG. 8(d) shows the first metal terminal portion 66 included in the ceramic capacitor according to the fifth embodiment of the present invention. The first metal terminal portion 66 is different from the first metal terminal portion 50 shown in FIG. 8(a) in terms of comprising the first stopper portion 56 and the first stopper portion 62, but it is the same for the rest of the constitutions as the first metal terminal portion 50. The first metal terminal portion 66 comprises the first stopper portion 56 which is as similar to the first metal terminal portion 54 according to the third embodiment, and the first stopper portion 62 which is similar to the first metal terminal portion 60 according to the fourth embodiment. As such, the first metal terminal portion 66 may comprise the first stopper portion 56, 62 which is a pair facing to each other, and the ceramic capacitor comprising such first metal terminal portion 66 has excellent assembling property and the durability.

FIG. 8(e) shows the first metal terminal portion 70 included in the ceramic capacitor according to the sixth embodiment of the present invention. The first metal terminal portion 70 comprises the first fitting arm portions 35a, 35b facing the side face 20c, 20d arranged approximately parallel to the first mounting portion 39, among the side faces of the chip capacitor 20. However, the first metal terminal portion 70 is different from the first metal terminal portion 30 according to the first embodiment, and does not comprise the fitting arm portion holding the side faces perpendicular with respect to the first mounting portion 39.

On the contrary to the chip capacitor 20 shown in FIG. 7, in case the stacking direction of the chip capacitor is parallel with respect to the first mounting portion 39, as the first metal terminal portion 70 shown in FIG. 8(d), the size variation of the chip capacitor 20 is lesser when the chip capacitor 20 is held from the perpendicular direction with respect to the first mounting portion 39, and the holding force of the first fitting arm portions 35a, 35b can be stabilized. Also, the first metal terminal portion 70 has lesser contact points with the chip capacitor 20; hence it is advantageous from the point of preventing the squealing noise.

Figure 9:
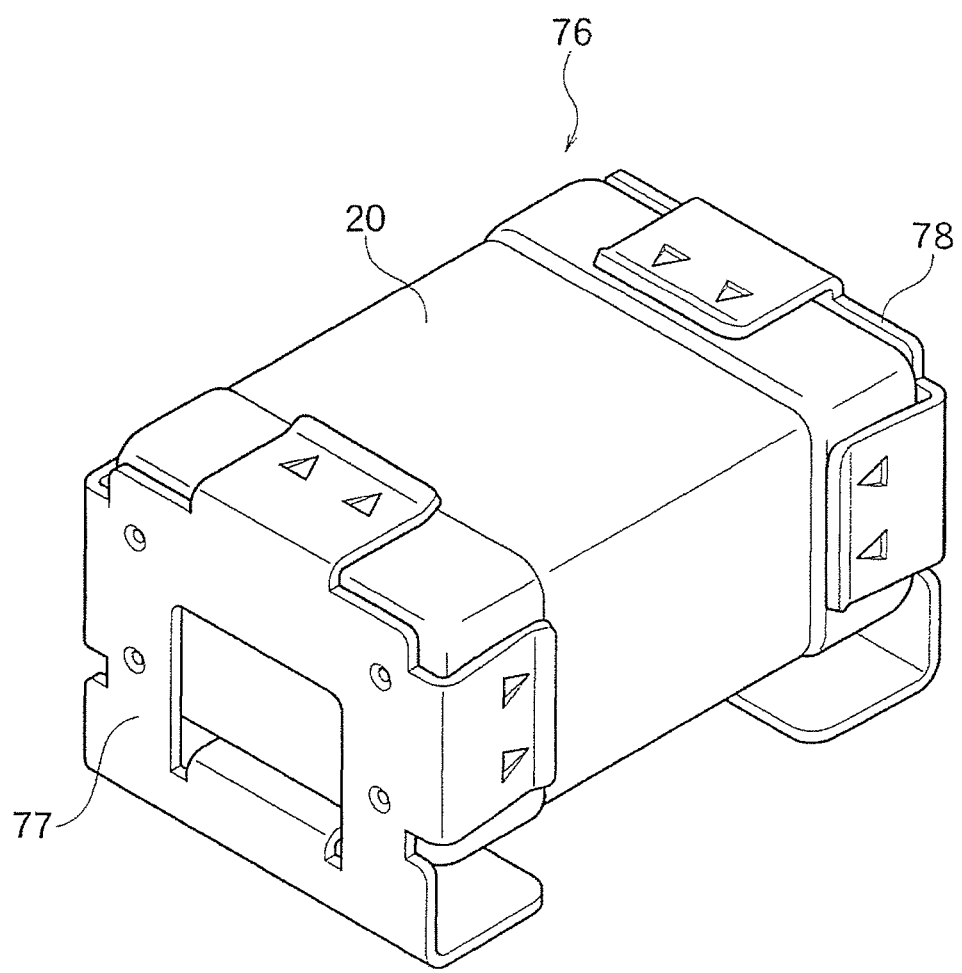
FIG. 9 is a perspective view of the ceramic electronic component according to the seventh embodiment of the present invention.

FIG. 9 is a perspective view of the ceramic capacitor 76 according to the seventh embodiment of the present invention. The ceramic capacitor 76 comprises one chip component, the first metal terminal portion 77, and the second metal terminal portion 78. As shown in FIG. 9, the number of the chip capacitor included in the ceramic capacitor 76 may be one, or it may be three or more. The ceramic capacitor 76 exhibits the same effect as the ceramic capacitor 10 according to the first embodiment.

The Eighth Embodiment

FIG. 12 to FIG. 17 is a schematic perspective view, a front view, a left side view, an upper view, and a bottom view of the ceramic capacitor 100 according to the eighth embodiment of the present invention. Among the parts included in the ceramic capacitor 100 according to the eighth embodiment, the same number is used to those same as the ceramic capacitor 10 according to the first embodiment, and for the same context the description will be omitted.

Figure 12:
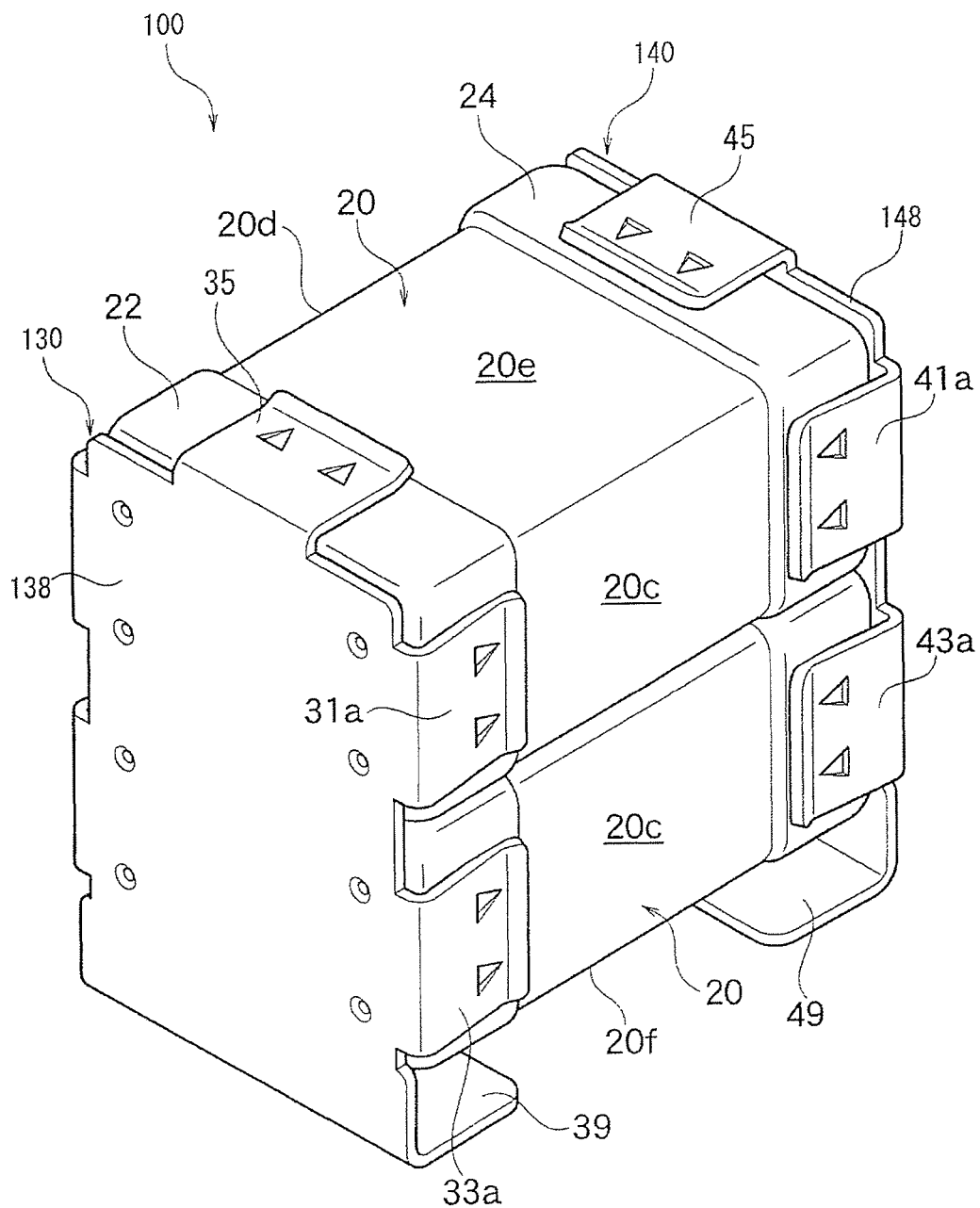
FIG. 12 is a schematic perspective view showing the ceramic electronic component according to the eighth embodiment of the present invention.
Figure 13:
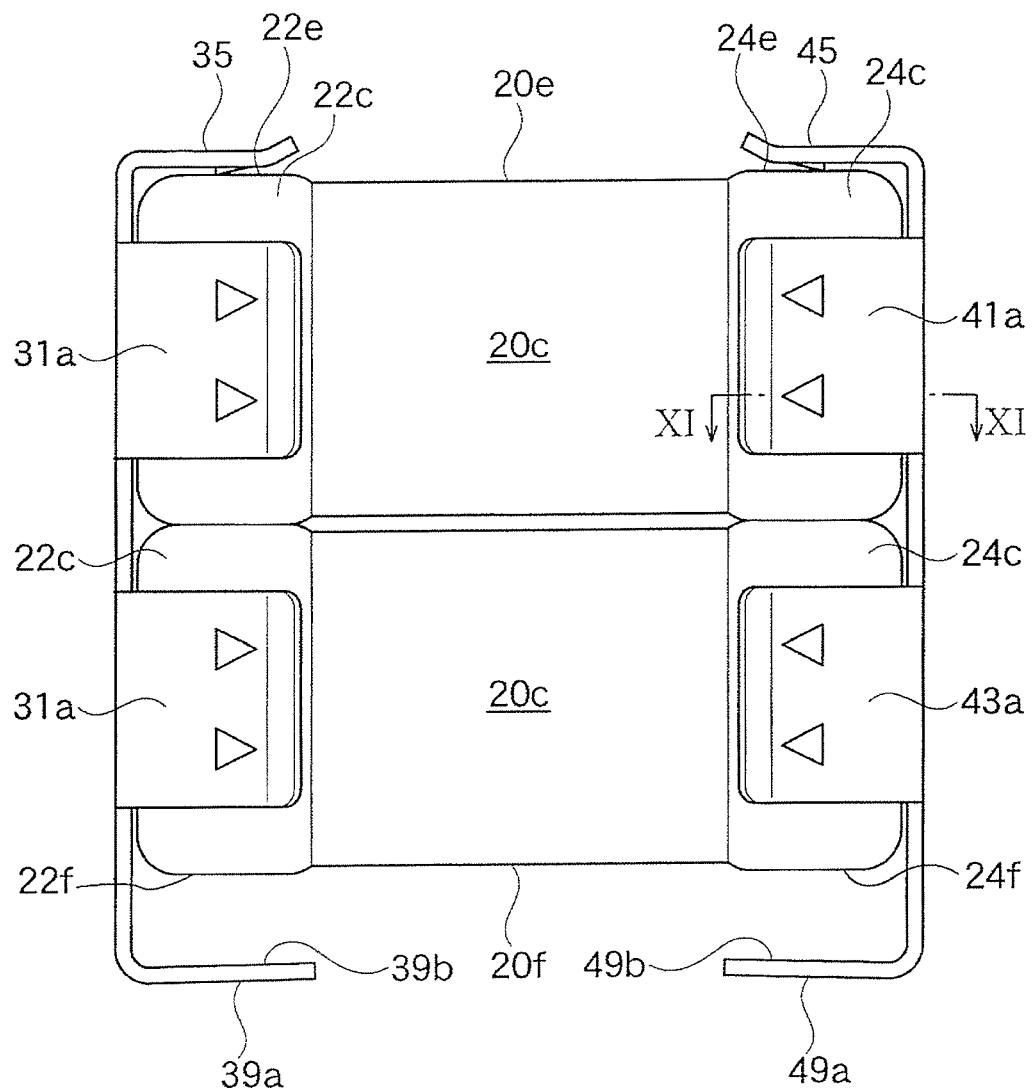
FIG. 13 is a front view of the ceramic electronic component of FIG. 12.

As shown in FIG. 12, the first metal terminal portion 130 and the second metal terminal portion 140 are attached at both ends of the chip capacitor 20, when the two chip capacitors 20 are stacked on against another, and it is held by the metal terminal portions 130, 140. The first metal terminal portion 130 comprises the first flat plate portion 138, the first stopper portion 35 and the first fitting arm portions 31a, 31b, 33a, 33b connecting with the first flat portion 138, and the first mounting portion 39 connecting with the same first flat plate portion 138 (refer to FIG. 12 to FIG. 16).

The first end face 20a of the chip capacitor 20 and the first flat plate portion 138 is connected by the first adhesive agent joint portion 90. As shown by the FIG. 14 and FIG. 15, the first adhesive agent joint portion 90 connects the center part of the first end face 20a and the connection portion 38c of the first flat plate portion 138 facing thereto, however the shape of the first adhesive agent joint portion 90 is not limited thereto. For example, the first adhesive agent joint portion 90 may be formed in plurality so that the outer peripheral proximity of the first end face 20a and the first flat plate portion 138 facing thereto are connected. Also, at the connection portion 38c with the first adhesive agent joint portion 90 of the first flat plate portion 138, the area having higher adhesiveness than other parts of the first metal portion 130 being metal plated, against the adhesive agent constituting the first adhesive agent joint portion 90 is formed. Note that, the connection portion 38c has similar constitution as the connection portion 48c of the second metal terminal portion 140 (refer to FIG. 17).

The first metal terminal portion 130 comprises two pairs of the first fitting arm portions 31a, 31b, 33a, 33b which holds the first terminal electrode 22 of the chip capacitor 20 in between.

At the first fitting arm portions 31a, 31b, 33a, 33b, the first engagement projection which engages with the first wraparound portions 22c to 22f of the first terminal electrode 22 is formed. Note that, the first metal terminal portion 130 is symmetrically arranged with the second metal terminal portion 140 with respect to the chip capacitor 20; however regarding the shape, it is the same as the second metal terminal portion 140. Therefore, the detailed structure of the first fitting arm portions 31a, 31b, 33a, 33b formed with the first engagement projection or the connection portion 38c of the first flat plate portion 138 will be described using the second metal terminal portion 140, and the description of the first metal terminal portion 130 will be omitted.

The first stopper portion 35 is arranged approximately perpendicular with respect to the first fitting arm portion 31a, 31b or so, and faces to the third side face 20e of the chip capacitor 20. The first stopper portion 56 does not form a pair as the first fitting arm portions 31a, 31b, and cannot hold the chip capacitor 20; however when assembling the chip capacitor 20 and the first metal terminal portion 130, by contacting the first stopper portion 35 and the third side face 20e, the positioning can be easily carried out.

The second metal terminal portion 140 comprises the second flat plate portion 148, the second stopper portion 45 and the second fitting arm portions 41a, 41b, 43a, 43b connecting with the second flat plate portion 148, and the second mounting portion 49 connecting with the same second flat plate portion 148. The second flat plate portion 148 of the second metal terminal portion 140 faces the second end face 20b of the chip capacitor 20.

Figure 14:
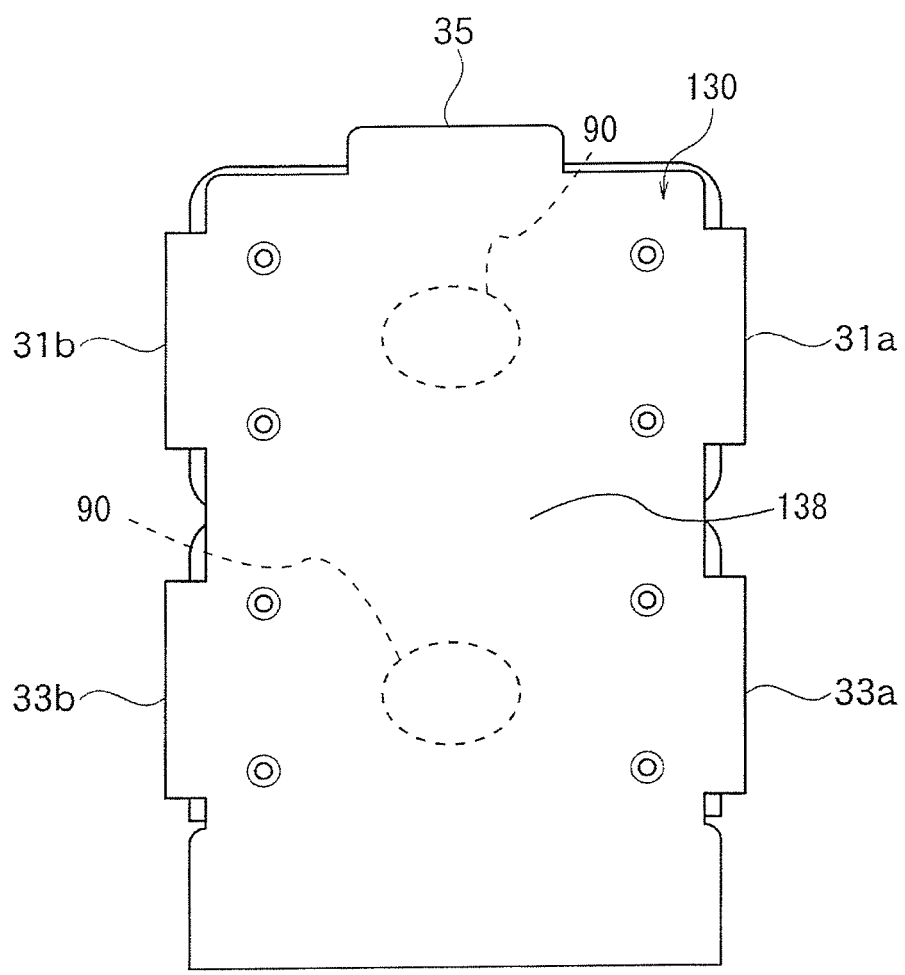
FIG. 14 is a left side view of the ceramic electronic component of FIG. 12.
Figure 15:
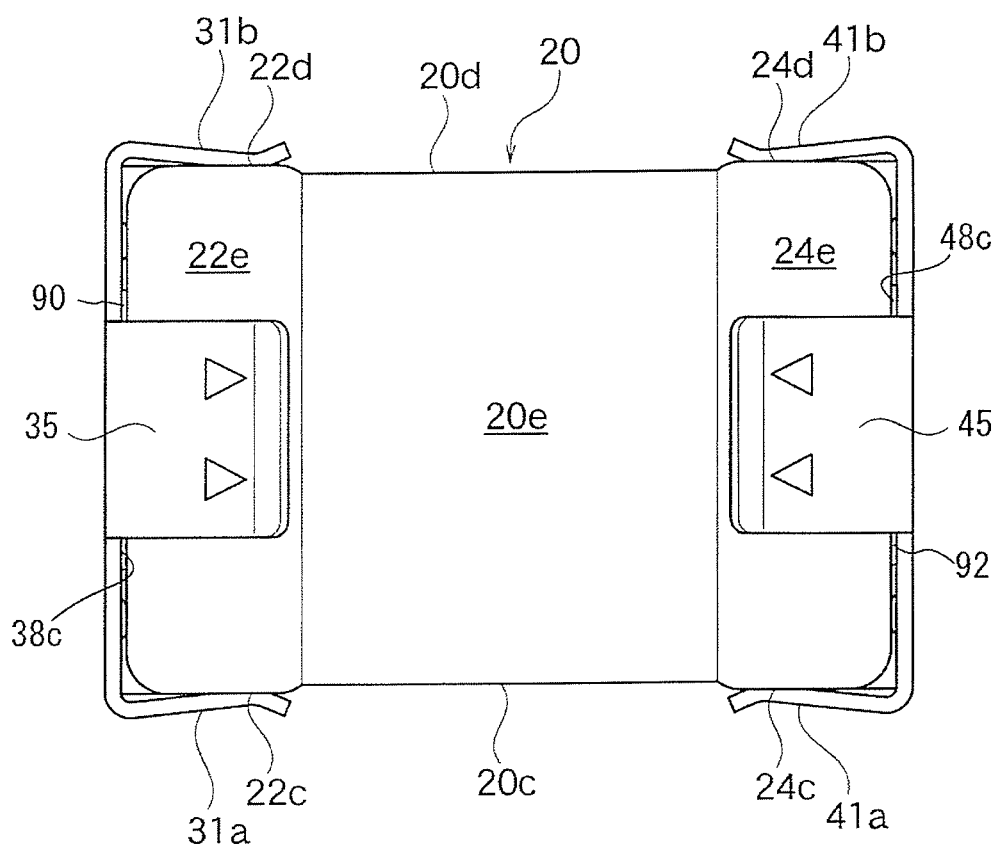
FIG. 15 is an upper view of the ceramic electronic component shown in FIG. 12.
Figure 16:
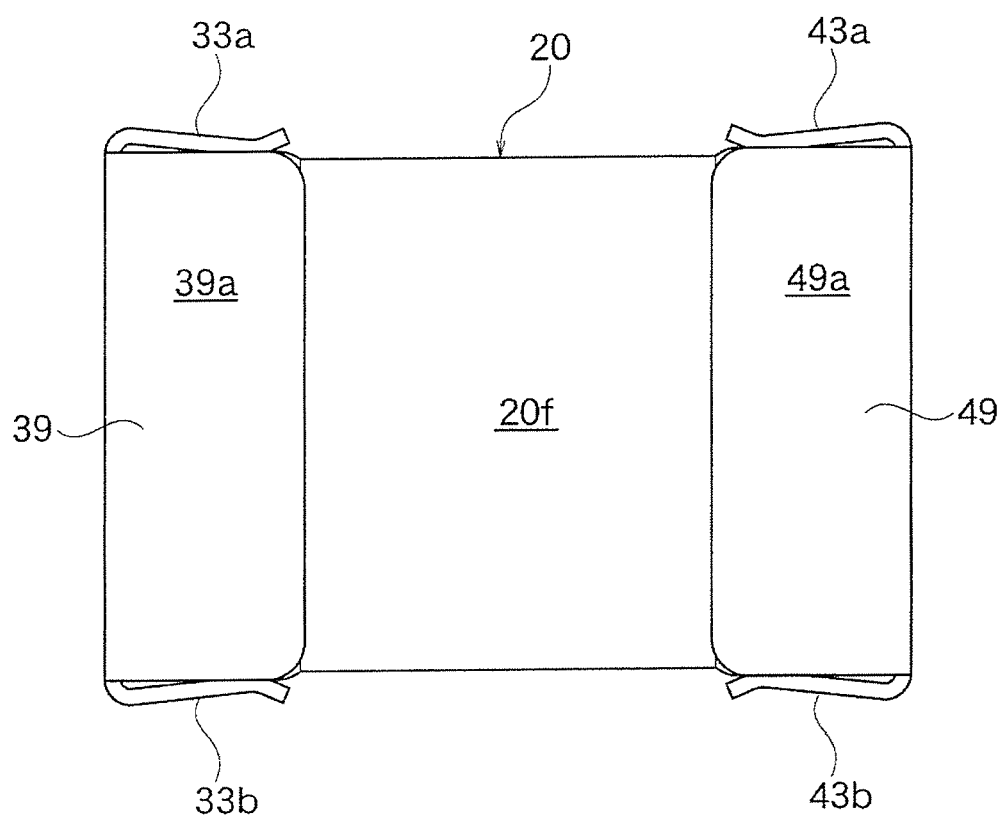
FIG. 16 is a bottom view of the ceramic electronic component shown in FIG. 12.
Figure 17:
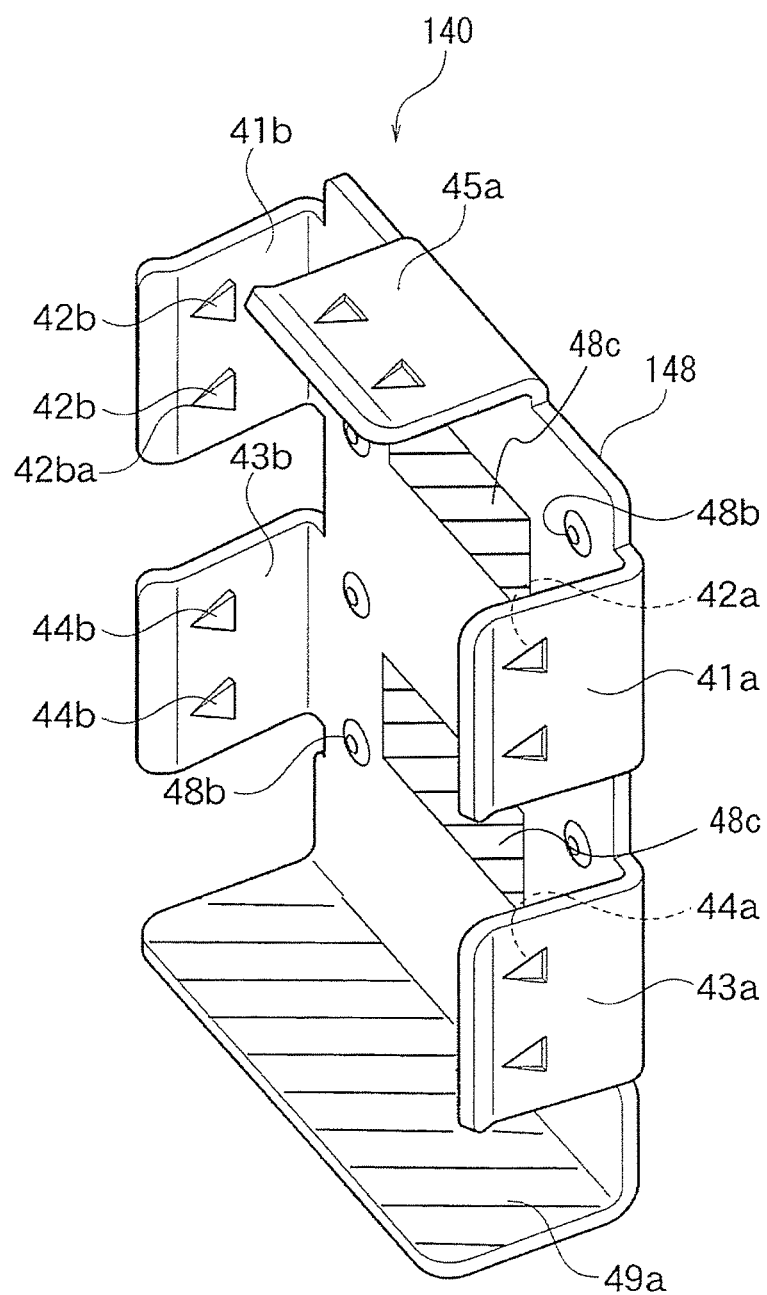
FIG. 17 is a perspective view of the second metal terminal portion included in the ceramic electronic component shown in FIG. 12.

As similar to the first metal terminal portion 130, the second flat plate portion 148 of the second metal terminal portion 140 and the second end face 20b of the chip capacitor 20 are connected by the second adhesive agent joint portion 92 (refer to FIG. 14 and FIG. 15). As shown in FIG. 17, at the connection portion 48c of the second adhesive agent joint portion 92 of the second flat plate portion 148, the area having higher adhesiveness against the adhesive agent constituting the second adhesive agent joint portion 92 is formed, than other portions of the second metal terminal portion 140 being metal plated (for example the second engagement projections 42b, 44b). As the adhesive agent constituting the first and the second adhesive agent joint portion 92, it is not particularly limited, however in order to enhance the fixing strength between the chip capacitor 20 and the metal terminal portion 130, 140, it is preferably a non-conductive adhesive agent. Generally, the conductivity component such as the conductive filler or the conductive metal particle which are added to impart the conductivity to the adhesive agent does not contribute to the improvement of the adhesive force. Therefore, by using the non-conductive adhesive agent constituted by resin or so which do not include the conductivity component such as the conductive filler or the conductive metal particle or so, higher adhesiveness can be obtained compared to the conductivity adhesive agent including the conductive component. As the non-conductivity adhesive agent, for example, the thermal setting resin such as epoxy resin, phenol resin or so can be used.

As shown in FIG. 12 and FIG. 17, the second metal terminal portion 140 comprises two pairs of second fitting arm portions 41a, 41b, 43a, 43b which holds the second terminal electrode 24 of the chip capacitor 20 in between.

As shown in FIG. 17, at each opposing face of the second fitting arm portions 41a, 41b, 43a, 43b, the second engagement projections 42b, 44b are formed. In FIG. 17, although it can not be observed since it is on the back side of other parts, the second engagement projections 42a, 44a are formed also at the second fitting arm portions 41a, 43a, as similar to the second fitting arm portions 41b, 43b.

The second engagement projections 42a, 42b, 44a, 44b engages with the second wraparound portions 24c to 24f of the second terminal electrode 24, and the second metal terminal portion 140 effectively prevents the second terminal electrode 24 from coming off. Also, by contacting the second engagement projections 42a, 42b, 44a, 44b and the second terminal electrode 24, the conductivity between the second terminal electrode 24 and the second fitting arm portions 41*a*, 43*a* can be secured. The shape of the second engagement projections 42*a*, 42*b*, 44*a*, 44*b* is not particularly limited to the quadrangular pyramid shape shown in FIG. 17, and it can be any shape as long as the second wraparound portions 24*c* to 24*f* can engage such as trigonal pyramid, partially spherical shape, or square pillar shape or so.

The second stopper portion 45 is arranged approximately perpendicular with respect to the second fitting arm portions 41*a*, 41*b* or so as similar to the first stopper portion 35; and faces the third side face 20*e* of the chip capacitor 20. The effect of the second stopper portion 45 is similar to the first stopper portion 35 of the first metal terminal portion 130.

Hereinafter, the production method of the ceramic capacitor 100 will be described.

The Production Method of the Chip Capacitor 20

The production method of the ceramic capacitor 10 according to the first embodiment will be omitted as it has already been described.

The Production Method of the First Metal Terminal Portion 130 and the Second Metal Terminal Portion 140

Figure 18:
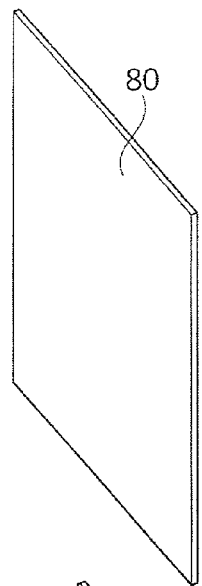
FIG. 18 is a conceptual diagram showing the production method of the second metal terminal portion included in the ceramic electronic component according to the eighth embodiment.
Figure 18:
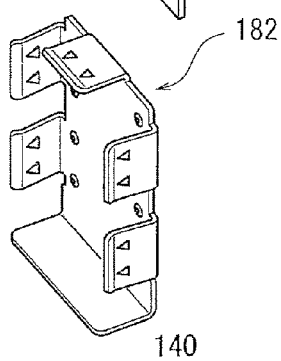
Figure 18:
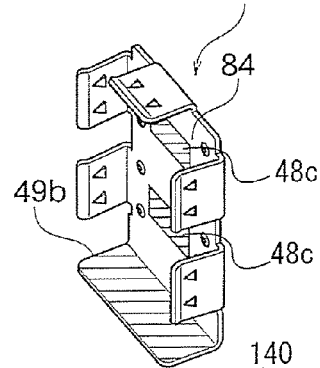
Figure 18:
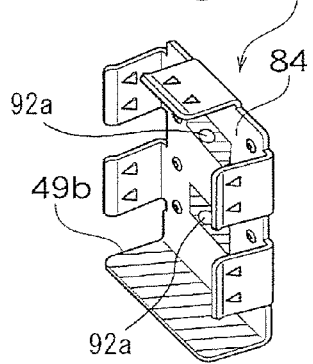

In the first metal terminal portion 130 and the second metal terminal portion 140, firstly, the metal board material 80 having a flat plate shape shown in FIG. 18(*a*) is prepared. Note that, the first metal terminal portion 130 and the second metal terminal portion 140 can be produced by the same production method; thus the second terminal portion 140 will be used as an example to describe.

Next, by mechanically processing the metal board material 80, the intermediate part 182 is obtained (FIG. 18(*b*)). The specific processing method is not particularly limited, and for example by using the pressure processing and the cutting processing or so, the shape of the second flat plate portion 148, the second fitting arm portions 41*a*, 41*b*, 43*a*, 43*b*, the second engagement projections 42*a*, 42*b*, 44*a*, 44*b*, the second stopper portion 45, and the second mounting portion 49 or so are formed.

Next, on the surface of the intermediate parts 182, by forming the metal coating 84 by plating, the second metal terminal portion 140 is obtained (FIG. 18(*c*)). During the plating treatment, by carrying out the resist treatment to the mounting portion upper face 49*b* of the second mounting portion 49 and the connection part 48*c* of the second flat plate portion 148, the plating is prevented from adhering to the mounting upper face 49*b* and the connection portion bottom face 29*a*. Thereby, the wettability of the mounting portion upper face 49*b* and the mounting portion bottom face 49*a* against the solder can be made different, and also the adhesiveness against the adhesive agent of the connection portion 48*c* can be further enhanced than the second engagement projections 42*a*, 42*b*, 44*a*, 44*b* being metal plated. Note that, after forming the metal coating 84 by carrying out the plating to the entire intermediate part 182, the metal coating formed to the mounting portion upper face 49*b* and the connection portion 48*c* can be removed by the laser releasing or so, so that the same difference can be made.

The Assembling of the Ceramic Capacitor 100

Two chip capacitors 20 obtained as mentioned in above are prepared, and while holding as shown in FIG. 12, the first metal terminal portion 130 and the second metal terminal portion 140 are respectively attached to the first terminal electrode 22 and the second terminal electrode 24; thereby obtained the ceramic capacitor 100. Before attaching to the chip capacitor 20, as shown in FIG. 18(*d*), the connection portions 38*c*, 48*c* of each metal terminal portions 130, 140 is pasted in advance with the adhesive agent 92*a* which becomes the first adhesive agent joint portion 90 and the second adhesive agent joint portion 92 after curing. Next, by bringing each end face 20*a*, 20*b* of the chip capacitor 20 and the flat plate portion 138, 148 of the metal terminal portion 130, 140 closer to each other, the terminal electrodes 22, 24 are embedded in between a pair of the fitting arm portions 31*a*, 31*b*, 41*a*, 41*b* or so.

In case the adhesive agent 92*a* is a thermal setting adhesive agent, after attaching the first and second metal terminal portions 130, 140 to the chip capacitor 20, by curing the adhesive agent 92*a* by carrying out the heat treatment at the predetermined temperature, the first adhesive agent joint portion 90 and the second adhesive agent joint portion 92 are formed. Note that, depending on the needs, the wraparound portions 22*c* to 22*f*, 24*c* to 24*f* of the terminal electrodes 22, 24, and the engagement projections 42*a*, 42*b*, 44*a*, 44*b* engaged therewith can be welded by melting the metal plating formed on at least one surface.

As such, in the ceramic capacitor 100, the first and the second metal terminal portions 130, 140 comprises the fitting arm portions 31*a*, 31*b*, 33*a*, 33*b*, 41*a*, 41*b*, 43*a*, 43*b*, and the wraparound portions 22*c* to 22*f*, 24*c* to 24*f* of the terminal electrodes 22, 24 of the chip capacitor 20 is held by placing in between. Therefore, the ceramic capacitor 100 can be easily assembled and the production is easy. Also, even in case it is used under the environment of high temperature or with the large temperature change, the ceramic capacitor 100 has no risk of breaking the bonding between the chip capacitor 20 and the metal terminal portions 130, 140 due to the difference of the thermal expansion rate between the bonding material and the metal terminal portions 130, 140, unlike the conventional arts using the solder or so as the bonding material.

Figure 32:
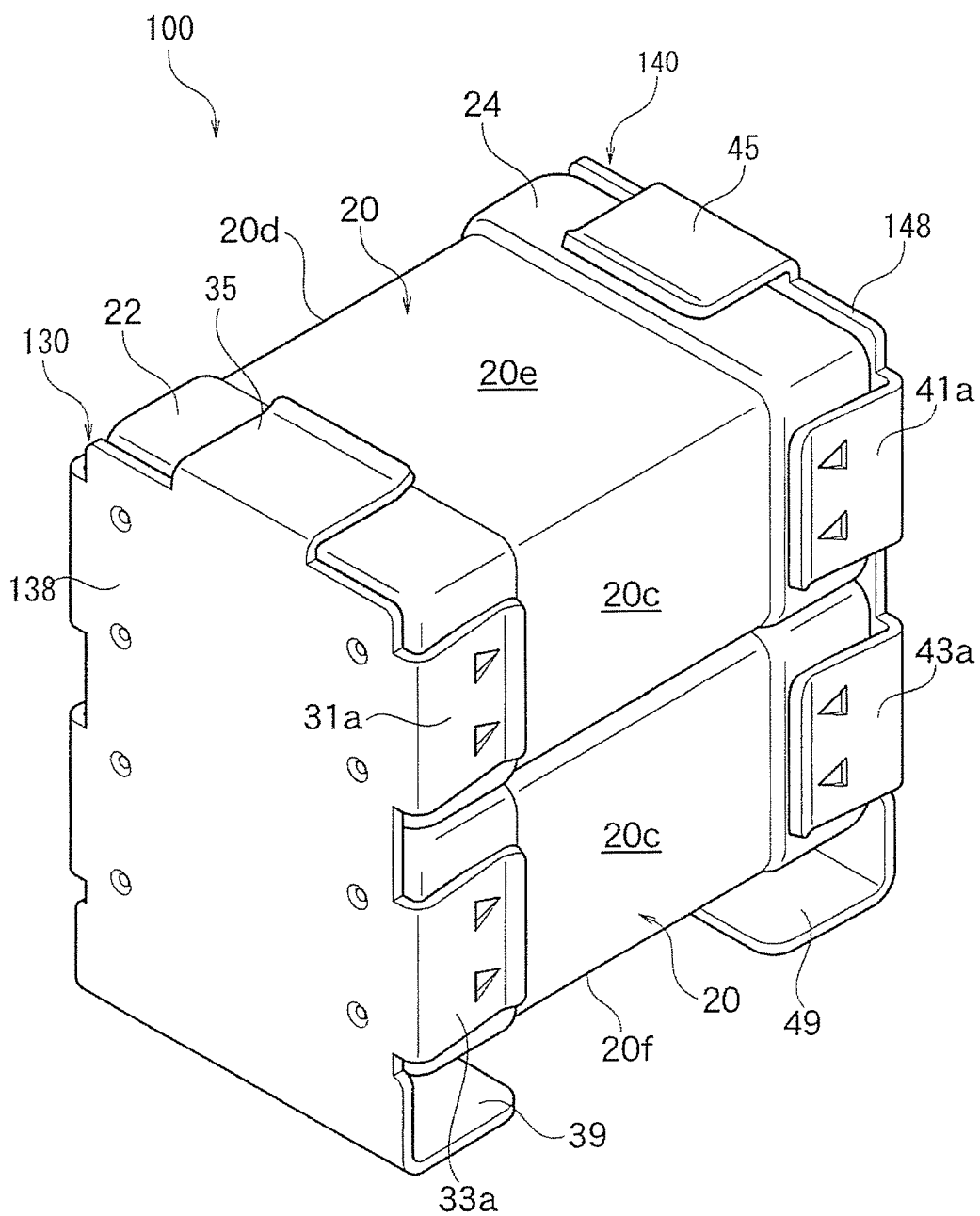
FIG. 32 is a schematic perspective view showing the ceramic electronic component according to the modified example of the eighth embodiment.

Also, the ceramic capacitor 100 secures good conductivity between the chip capacitor 20 and the metal terminal portions 130, 140, by holding the chip capacitor 20 with the fitting arm portions 31*a*, 31*b*, 41*a*, 41*b* or so, while on the other hand reinforcing the mechanical bonding between the chip capacitor 20 and the metal terminal portion 130, 140 by the adhesive agent joint portions 90, 92 which connects the end faces 20*a*, 20*b* of the chip capacitor 20 and the flat plate portion of the metal terminal portions 130, 140. Therefore, the ceramic capacitor 100 has suitable reliability electrically and also structurally against the deformation force and impact from the out side. Also, the ceramic capacitor 100 can suppress the phenomena which the vibration caused by the electrostriction generated by the chip capacitor 20 transferring to the mounting substrate via the metal terminal portions 130, 140, compared to the conventional art connecting the chip capacitor and the terminals via solder or so; and can prevent the squealing noise when driving the ceramic capacitor 100. Note that, in the ceramic capacitor 100 according to the eighth embodiment, the same projection as the engagement projection 42*a* of the fitting arm portions 31*a*, 41*a* is formed at the stopper portions 35, 45; however as shown in FIG. 32, the projection may not be formed at the stopper portion 35, 45.

The Ninth Embodiment

Figure 19:
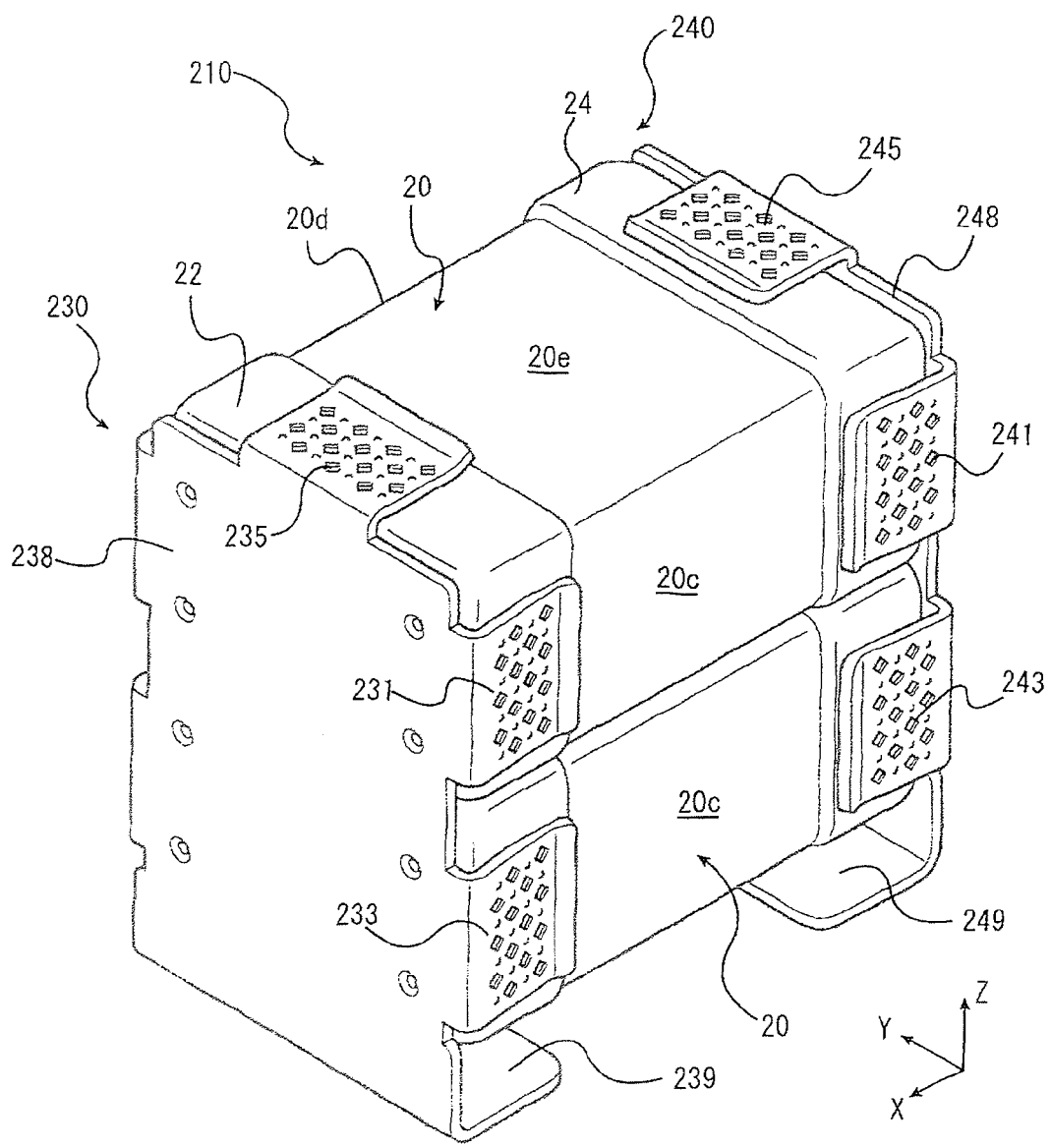
FIG. 19 is a schematic perspective view shown in ceramic electronic component according to the ninth embodiment of the present invention.

FIG. 19 is a schematic perspective view showing the ceramic capacitor 210 according to the ninth embodiment of the present embodiment. The ceramic capacitor 210 comprises two chip capacitors, and the first metal terminal portion 230 and the second metal terminal portion 240 attached to the chip capacitor 20. Note that, when explaining each embodiment, the ceramic capacitor having the metal terminal portions 230, 240 attached to the chip capacitor 20 is used as an example, however the ceramic electronic component of the present invention is not limited thereto, and the metal terminal portions 230, 240 may be attached to the chip component other than the capacitor. Note that, for the explanation of the ceramic capacitor 210, as shown in FIG. 19, the X axis direction is the direction connecting the first end face 20a and the second end face 20b of the chip capacitor 20, the Y axis direction is the direction connecting the first side face 20c and the second side face 20d, and the Z axis direction is the direction connecting the third end face 20e and the fourth side face 20f.

The structure of the chip capacitor 20 included in the ceramic capacitor 210 according to the ninth embodiment is as same as the chip capacitor 20 included in the ceramic capacitor 210 according to the first embodiment (refer to FIG. 7). The shape and the size of the chip capacitor 20 may be determined accordingly depending on the purpose and the use. In case of the ceramic capacitor 210 according to the ninth embodiment, when the chip capacitor 20 is rectangular parallelepiped shape, usually it is length (0.6 to 5.6 mm, preferably 3.2 to 5.6 mm)×width (0.3 to 5.0 mm, preferably 1.6 to 5.0 mm)×thickness (0.1 to 1.9 mm, preferably 1.6 to 5.6 mm) or so.

As shown in FIG. 19 and FIG. 7, the first terminal electrode 22 of the chip capacitor 20 is formed so that it wraps around the side faces 20c to 20f from the first end face 20a. Therefore, the first terminal electrode 22 comprises the part arranged at the first end face 20a, the part arranged at the first side face 20c to the fourth side face 20f (refer to FIG. 19 to FIG. 23).

Also, the second terminal electrode 24 of the chip capacitor 20 is formed so that it wraps around other parts of the side faces 20c to 20f from the second end face 20b (the different part from the part where the first terminal electrode 22 is wrapping around). Therefore, the second terminal electrode 24 comprises the part arranged at the second end face 20b, and the part arranged at the first side face 20c to fourth side face 20f (refer to FIG. 19 to FIG. 23). Also, in the first side face 20c to the fourth side face 20f, the first terminal electrode 22 and the second terminal electrode 24 are formed by taking predetermined space.

As shown in FIG. 19, the first metal terminal portion 230 and the second metal terminal portion 240 are attached at both end portions of the chip capacitor 20, and two chip capacitors 20 are supported by the metal terminal portions 230, 240 while being stacked on against each other. The first metal terminal portion 230 comprises the first flat plate portion 238, the first fitting arm portions 231, 233 and the stopper portion 235 connecting to the first flat plate portion 238, and the first mounting portion 239 connecting to the same first flat plate portion 238 (refer to FIG. 19 to FIG. 23).

The first flat plate portion 238 of the first metal terminal portion 230 faces the first end face 20a of the chip capacitor 20.

Figure 21:
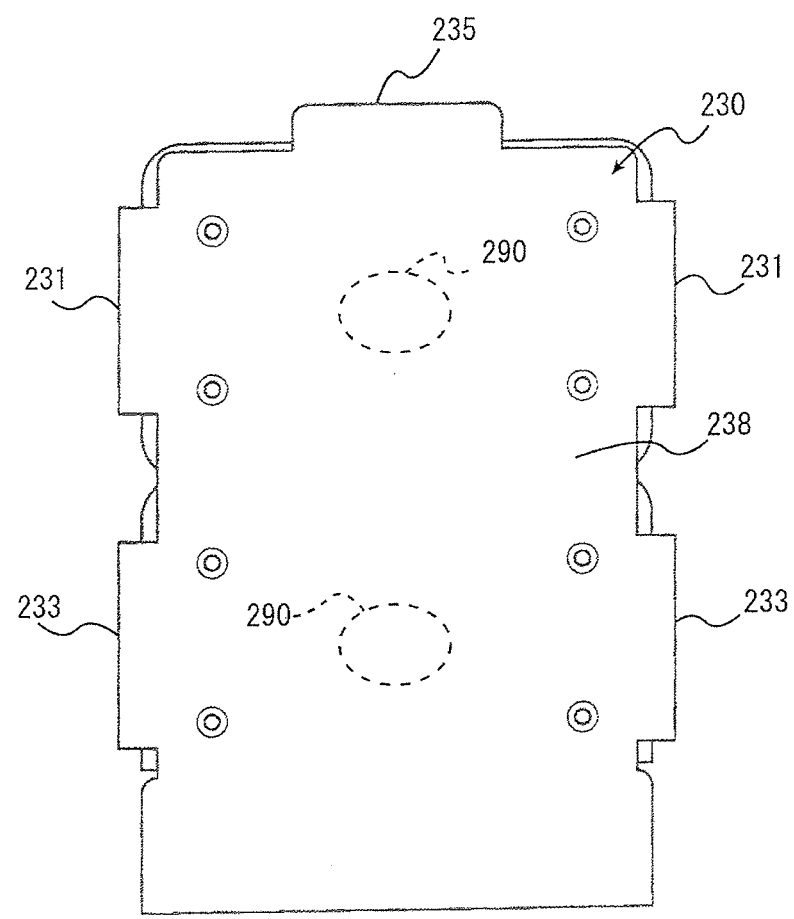
FIG. 21 is a left side view of the ceramic electronic component shown in FIG. 19.
Figure 22:
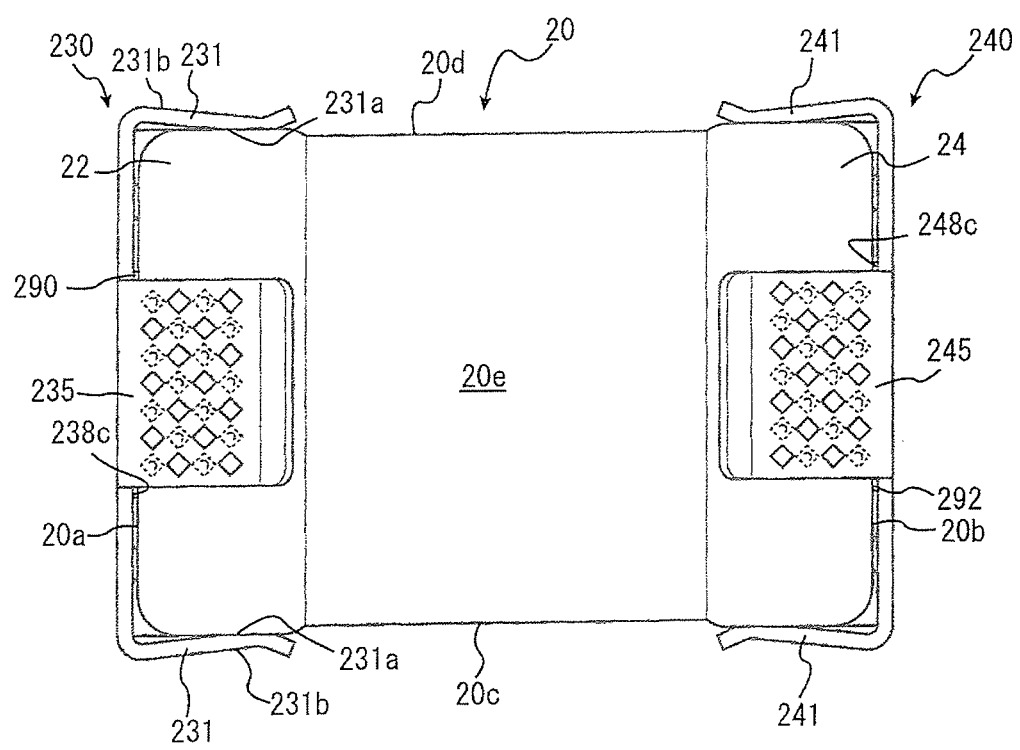
FIG. 22 is an upper view of the ceramic electronic component shown in FIG. 19.
Figure 23:
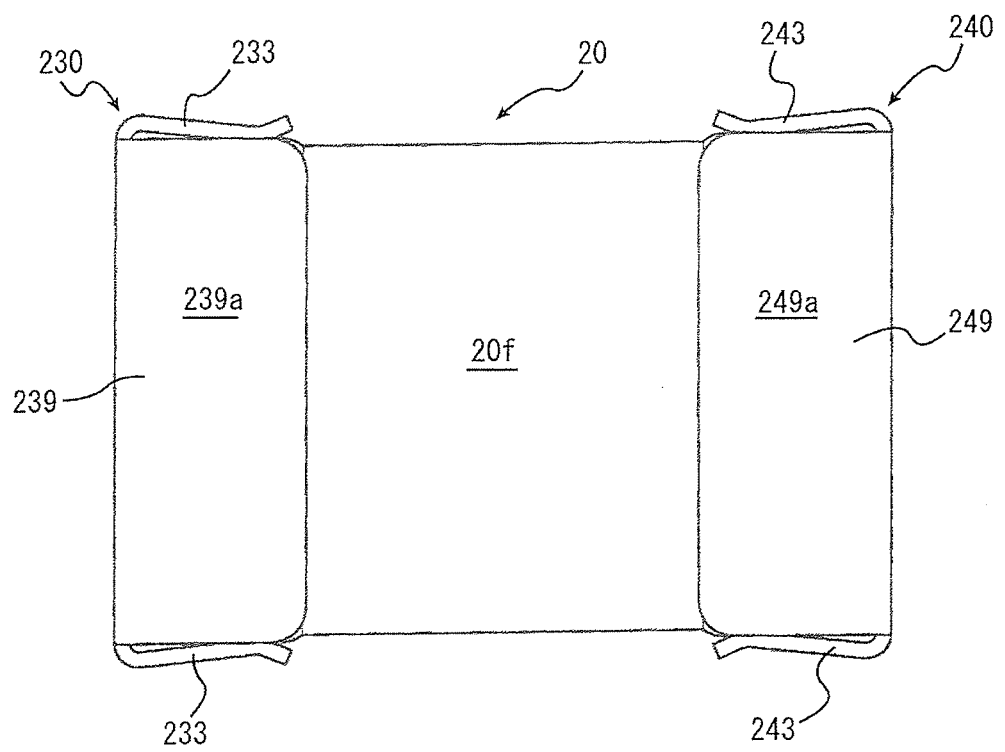
FIG. 23 is a bottom view of the ceramic electronic component shown in FIG. 19.

Also, the first end face 20a and the first flat plate portion 238 are connected by the first adhesive agent joint portion 290. As shown by FIG. 21 and FIG. 22, the first adhesive agent joint portion 290 connects the center part of the first end face 20a of the chip capacitor 20, and the connection portion 238c of the first flat plate portion 238 facing thereto; however the shape of the first adhesive agent joint portion 290 is not limited thereto. For example, plurality of first adhesive agent joint portions 290 may be formed so that it connects the outer peripheral proximity of the first end face 20a and the first flat plate portion 238 facing thereto. Also, at the connection portion 238c with the first adhesive agent joint portion 290 of the first flat plate portion 238, the area having higher adhesiveness against the adhesive agent constituting the first adhesive agent joint portion 290, than other part of the first metal terminal portion 230 being metal plated. Note that, the connection portion 238c has similar constitution as the connection portion 248c of the second metal terminal portion 240 (refer to FIG. 24).

The first metal terminal portion 230 comprises two pairs of the first fitting arm portions 231, 233 which holds the side faces 20c, 20d of each chip capacity 20 in between. A pair of the first fitting arm portion 231 holds a pair of the side faces 20c, 20d of the upper side of the chip capacitor 20 in between. Also, other pair of first fitting arm portions 233 holds a pair of the side faces 20c, 20d of the lower side of the chip capacitor 20 in between (refer to FIG. 21).

The first fitting arm portions 231, 233 faces the side faces 20c, 20d arranged approximately perpendicular to the first mounting portion 239, among the side faces 20c to 20f of the chip capacitor 20 (refer to FIG. 21).

At the first arm inner face 231a which is facing the chip capacitor 20 of the first fitting arm portions 231, 233, plurality of first inner side convex portions projecting out towards the chip capacitor 20 are formed, and at least part of the plurality of first inner side convex portions engages to the first terminal electrode 22. Also, at the first arm outer face 231b which is the face opposite of the first arm inner face of the first fitting arm portions 231, 233, plurality of the first outer side convex portions projecting out towards the opposite direction from the chip capacitor 20 are formed (for the first arm inner face 213a and the first arm outer face 231b, refer to FIG. 22).

Note that, the first metal terminal portion 230 is symmetrically arranged with the second metal terminal portion 240 against the chip capacitor 20; however the shape is the same as the second metal terminal portion 240. Therefore, for detail description of the connection portion 238c of the first flat plate portion 238, or the first fitting arm portions 231, 233 formed with the first inner side convex portion and the first outer side convex portion, it will be described by using the second flat plate portion 248 and the second fitting arm portions 241, 243 of the second metal terminal portion 240, and the explanation of the first metal terminal portion 230 will be omitted.

The first stopper portion 235 is arranged approximately perpendicular to the first fitting arm portions 231, 233, and faces the third side face 20e of the chip capacitor 20. Also, at the first stopper portion 235, the convex and concave shape as same as the first fitting arm portion 231 may be formed as well. The first stopper portion 235 does not form a pair such as the first fitting arm portions 231, 233, and can not hold the chip capacitor; however when assembling the chip capacitor 20 and the first metal terminal portion 230, the positioning can be easily carried out by contacting the first stopper portion 235 and the third side face 20e.

Figure 20:
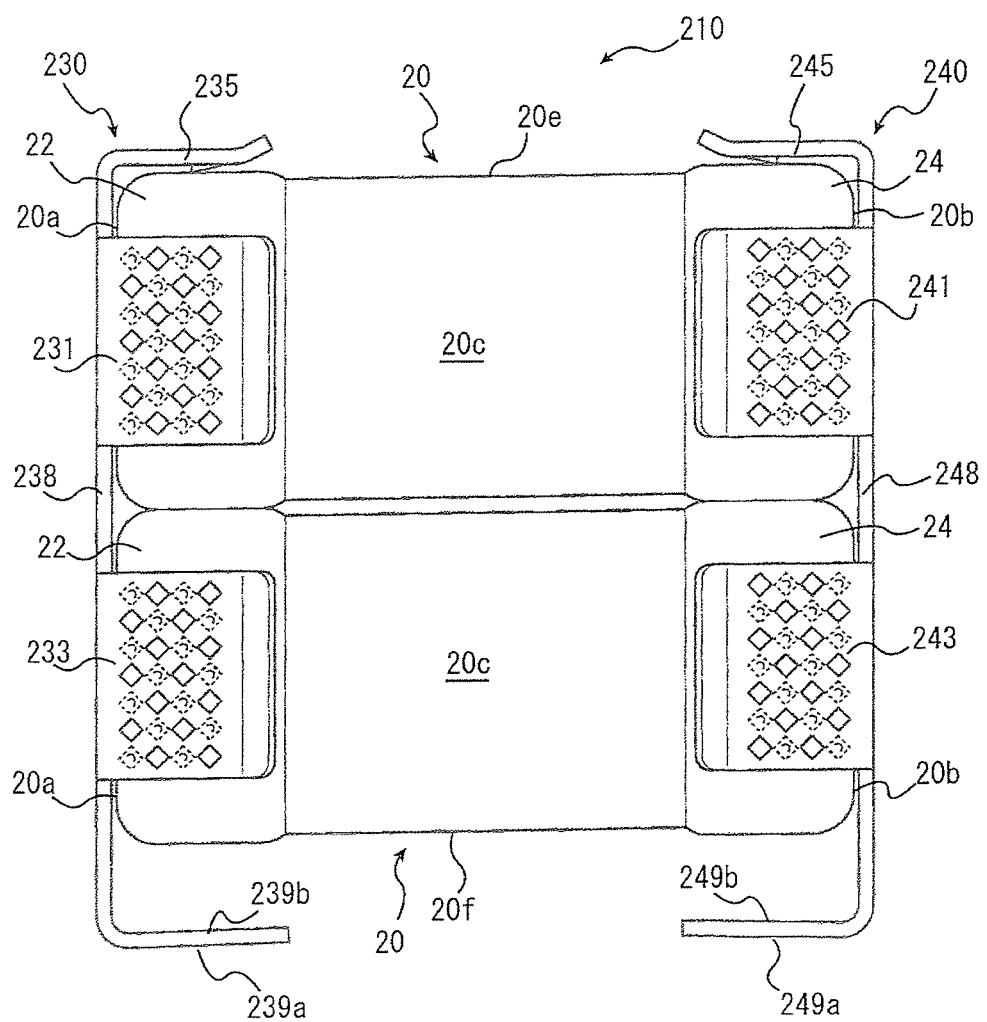
FIG. 20 is a front view of the ceramic electronic component shown in FIG. 19.

As shown in FIG. 19 and FIG. 20, the first mounting portion 239 of the first metal terminal portion 230 extends approximately parallel to the fourth side face 20f of the chip capacitor 20. Also, the first mounting portion 239 is arranged by taking the predetermined space from the fourth side face 20f of the lower side of the chip capacitor 20. The first mounting portion 239 is a part being bonded to the substrate by the solder or so when the ceramic capacitor 210 is mounted to the substrate or so, and the mounting portion bottom face 239a which is the surface of the opposite side of the chip capacitor 20 of the first mounting portion 239 (refer to FIG. 20) are arranged so that it faces the substrate which is the subject to be mounted. The mounting portion upper face 39b which is the surface of the chip capacitor 20 side of the first mounting portion 239 preferably has lower wettability against the solder than the mounting portion bottom face 239a, from the point of preventing the solder from excessively wrapping around when mounting the chip capacitor 20 to the substrate.

The second metal terminal portion 240 comprises the second flat plate portion 248, the second fitting arm portion 241, 243 and the second stopper portion 245 connecting to the second flat plate portion 248, and the second mounting portion 249 connecting to the second flat plate portion 248. The second flat plate portion 248 of the second metal terminal portion 240 faces the second end face 20b of the chip capacitor 20.

Figure 24:
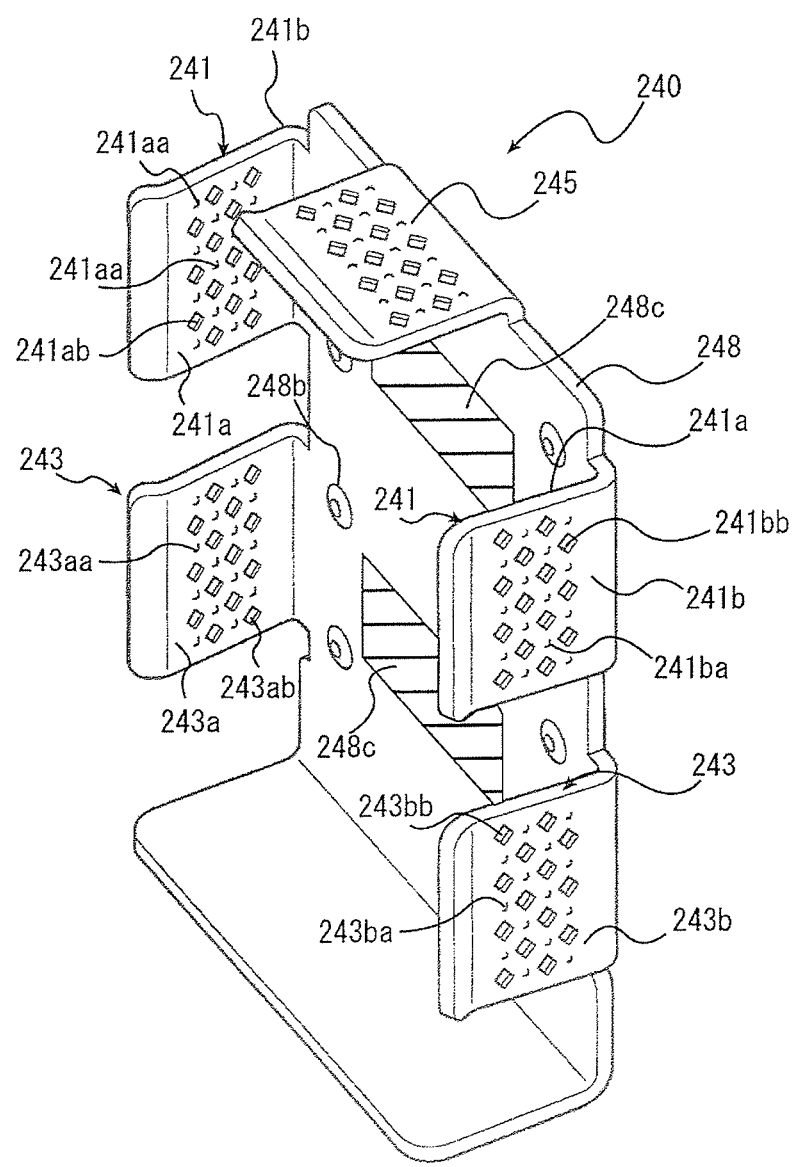
FIG. 24 is a perspective view of the second metal terminal portion included in the ceramic electronic component shown in FIG. 19.

FIG. 24 is the perspective view showing the second metal terminal portion 240. As shown in FIG. 24, at the second flat plate portion 248, the second projection portion 248b is formed. The second projection portion 248b contacts with the second end face 20b of the chip capacitor 20 by projecting out towards the second end face 20b. The second projection portion 248b exhibit the effect to suppress the transferring of the vibration of the chip capacitor 20 to the second metal terminal portion 240.

As similar to the first metal terminal portion 230, the second flat plate portion 248 of the second metal terminal portion 240 and the second end face 20b of the chip capacitor 20 are connected by the second adhesive agent joint portion 292 (refer to FIG. 22). As shown in FIG. 24, at the connection portion 248c of the second flat plate portion 248 with the second adhesive agent joint portion 292, for example the surface treatment such as to remove the metal coating can be carried out, thereby an area having higher adhesiveness against the adhesive agent constituting the second adhesive agent joint portion 292 are formed, with respect to other portion (for example, the second inner side convex portion 243aa) of the second metal terminal portion 240 formed with the metal coating. As the adhesive agent constituting the first and the second adhesive agent joint portions 292, it is not particularly limited; however in order to enhance the adhered strength between the chip capacitor 20 and the metal terminal portions 230, 240, it is preferably non-conductive adhesive agent. Generally, the conductive component such as the conductive filler or the conductive metal particle or so which are added in order to impart the conductivity to the adhesive agent does not contribute to the improvement of the adhesive force. Therefore, by using the non-conductive adhesive agent constituted by the resin which does not include the conductive component such as the conductive filler or the conductive metal particle, the high adhesiveness can be obtained with respect to the conductive adhesive agent including the conductive component. As the non-conductive agent, for example, the thermal setting resin such as epoxy resin, phenol resin or so can be used.

As shown in FIG. 19 and FIG. 24, the second metal terminal portion 240 comprises two pairs of the second fitting arm portions 241, 243 each holding the side faces 20c, 20d of the chip capacitor in between. A pair of the second fitting arm portion 241 holds a pair of the side faces 20c, 20d of the upper side of the chip capacitor in between. Also, another pair of the second fitting arm portions 243 holds a pair of the side faces 20c, 20d of the lower side of the chip capacitor 20 in between (refer to FIG. 22 and FIG. 23).

The second fitting arm portions 241, 243 faces the side faces 20c, 20d arranged approximately perpendicular to the second mounting portion 249, among the side faces 20c to 20f of the chip capacitor 20 (refer to FIG. 22).

Figure 29:
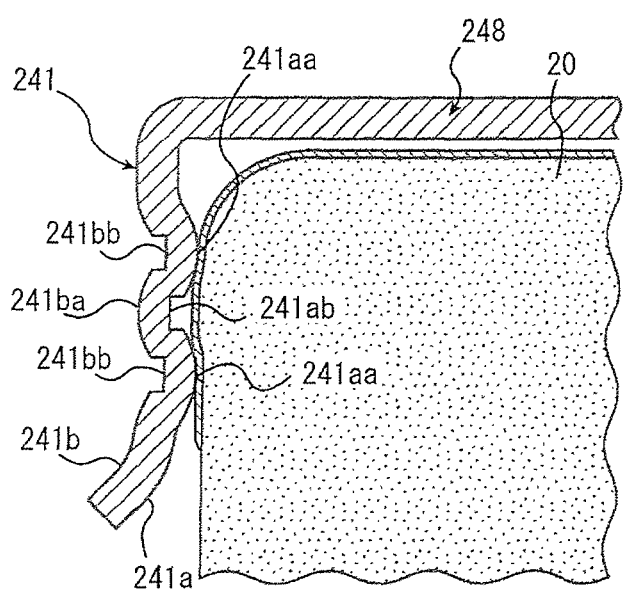
FIG. 29 is a partial cross section of enlarged view of the nearby area of the second fitting arm portion shown in FIG. 19.

As shown in FIG. 24, at the second arm inner face 241a, 243a which is facing the chip capacitor 20 of the second fitting arm portions 241, 243, plurality of second inner side convex portions 241aa, 243aa projecting out towards the chip capacitor 20 are formed, and at least part of plurality of the second inner side convex portions 241aa, 243aa engages with the second terminal electrode 24 (refer to FIG. 29). Also, at the second arm outer faces 241b, 243b which is the face of the opposite side of the second arm inner face 241a, 243a of the second fitting arm portions 241, 243; plurality of second outer side convex portions 241ba, 243ba projecting out towards the opposite direction of the chip capacitor 20 are formed.

At least part of the second inner side convex portions 241aa, 243aa, engages with the part which is wrapping around the side faces 20c, 20d of the chip capacitor 20, among the second terminal electrode 24; thereby prevents the second metal terminal portion 20 from coming off from the second terminal electrode 24, and also enables to secure the conductivity between the second terminal electrode 24 and the second fitting arm portions 241, 243. The shape of the second inner side convex portions 241aa, 243aa are not particularly limited, as long as it is a shape which can engage with the side faces 20c, 20d of the chip capacitor 20 such as quadrangular pyramid, trigonal pyramid, partially sphere shape, square pillar shape or so. Also, in the example shown in FIG. 24, the height of the projection of the second inner side convex portions 241aa, 243aa are constant; however the projection height of the second inner side convex portion is not limited thereto, and it may be changed depending on the surface shape of the side faces 20c, 20d of the chip capacitor 20 facing against each other. For example, the second inner side convex portion which changes the projection height along the R shape of the corner part of the chip capacitor 20 may be formed at the second arm inner face.

FIG. 29 is a partial cross section enlarging the nearby area of the second fitting arm portion 241. As shown in FIG. 29, at the back side of the part where the second inner side convex portion 241aa of the second arm inner face 241a is formed is a second outer concave portion 241bb which is dented at the second arm outer face 241b; and the backside of the part where the second outer side convex portion 241ba is formed at the second arm outer face 241b is a second inner side concave portion 241ab which dented at the second arm inner face 241a. Therefore, as shown in FIG. 24, at the second arm inner face 241a and the second arm outer face 241b, the convex and concave shape which is the convex portions 241aa, 241ba and the concave portions 241ab, 241bb are formed. Further, the second arm inner face 241a and the second arm outer face 241b which is in a back and front relation, the convex portions 241aa, 241ba and the concave portions 241ab, 241bb are in reversed arrangement. For the second fitting arm portion 243, it is the same as the second fitting arm portion 241.

Figure 30:
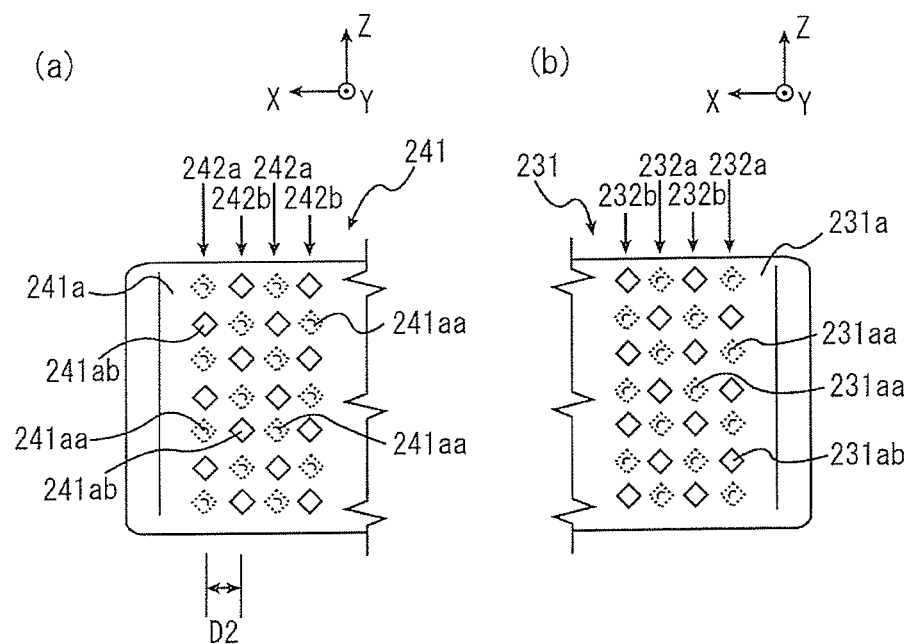
FIG. 30 is a conceptual diagram explaining the arrangement of the inner convex portion of the first and second fitting arm portion according to the deformed example.

FIG. 30 is a conceptual figure describing the arrangement of the inner side convex portions 241aa, 231aa of the second arm inner face 241a (FIG. 30(a)) and the first arm inner face 231a (FIG. 30(b)). As shown in FIG. 30(a), at the second arm inner face 241a, the second convex alignment portions 242a, 242b constituted by plurality of the second inner side convex portions 241aa aligned along the fifth direction (Z axis direction) which is the direction perpendicular to the fourth direction (Y axis direction) which is the sandwiching direction of the of the second fitting arm portion 241 and the first direction (X axis direction) of the direction towards the second end face 20b from the first end face 20a of the chip capacitor 20. At the second arm inner face 241a, the second convex alignment portion 242a and the second convex alignment portion 242b are formed alternatingly along the first direction (X axis direction), and each two rows of the second convex alignment portion 242a and the second convex alignment portion 242b are formed, hence total of four rows are formed.

At the second arm inner face 241a, the second inner side convex portions 241aa included in the second convex alignment portion 242a have shifted position in the fifth direction (Z axis direction), with respect to the second inner side convex portions 241aa included in the adjacent second convex alignment portion 242b. In case the second inner side convex portions 241aa are formed by pressing, by forming the second inner side convex portions 241aa by shifting the position of the fifth direction, it is possible to arrange many second inner side convex portions 241aa in the predetermined area. The number of the inner side convex portions 241aa, the space between the second inner side convex portions 241aa adjacent to each other, the space between second convex alignment portions 242a and the second convex alignment portion 242b which are adjacent to each other are suitably controlled depending on, the shape or the weight of the chip capacitor 20, the material and the shape of the second metal terminal portion 240. For example, in case the chip capacitor 20 has length (X direction) of 0.6 to 7.5 mm, the space D2 between the second convex alignment portion 242a and the second convex alignment portion 242b which are adjacent to each other can be 0.05 to 0.8 mm or so.

As shown in FIG. 30(b), at the first arm inner face 231a, as similar to the second arm inner face 241a, the first convex alignment portions 232a, 232b are formed which are constituted by plurality of the first inner side convex portions 231aa aligned along the third direction (Z axis direction) which is the direction perpendicular to the second direction which is the sandwiching direction of the first fitting arm portion 231 and the first direction (X axis direction). At the first arm inner face 231a, as similar to the second arm inner face 241a, the first convex alignment portion 232a and the first convex alignment portion 232b are formed alternatingly along the first direction (X axis direction), and two rows for each of the first convex alignment portion 232a and the first convex alignment portion 232b are formed, hence total of 4 rows are formed. Also, in the first arm inner face 231a, the first inner side convex portion 231aa included in the first convex alignment portion 232a has the shifted position of the third direction (Z axis direction), with respect to the first inner side convex portion 231a included in the adjacent first convex alignment portion 232b, which is also the same as the second arm inner face 241a. Regarding the number of first inner side convex portion 231aa, the space between the first inner convex portions 231aa which are adjacent to each other, the space between the first convex alignment portion 232a and the adjacent first inner convex alignment portion 232b or so, it is as same as the second arm inner face 241a.

Figure 28:
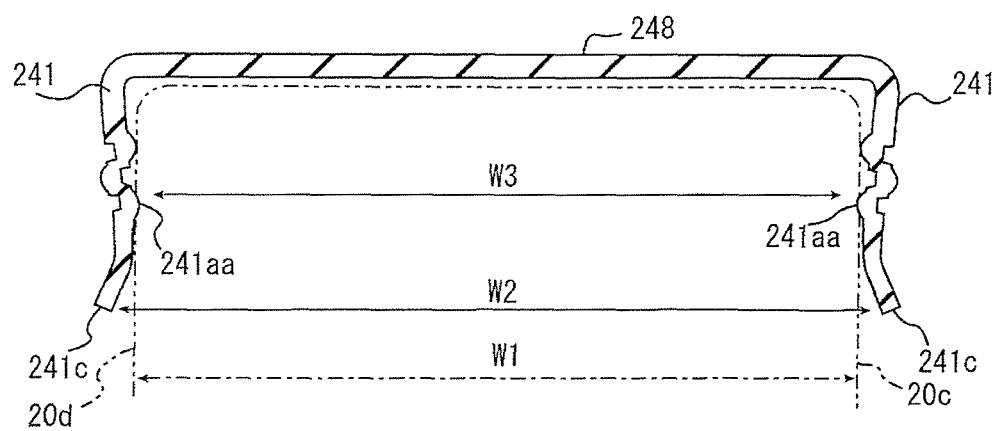
FIG. 28 is a cross section of the second metal terminal according to the ninth embodiment.

FIG. 28 is a cross section of the second metal terminal portion 240, and it is a cross section formed at the second arm inner face 241a of the second fitting arm portion 241, and passing through the second inner side convex portions 241aa which is facing against each other. When the second metal terminal portion 20 are in a free state (state of which the chip capacitor is not held), the space W3 from the top of the second inner side convex portion 241aa from the top of the second inner side portion 241aa wherein at least part are facing against each other are narrower than the space W1 which is from the first side face 20c to the second side face 20d of the chip capacitor 20. Therefore, as shown in FIG. 19, when the second terminal electrode 24 of the chip capacitor 20 is inserted between a pair of the second fitting arm portions 241, the second metal terminal portion 240 resiliently deforms, and the second metal terminal portion 240 can hold the second terminal electrode 24 between the second fitting arm portion 241 which faces the second metal terminal portion 240.

Also, the tip portion 241c of the second fitting arm portion 241 is bent so that it spaces apart from each other, thereby the second terminal electrode 24 can be smoothly inserted between the second fitting arm portions 241. In this case, the space W2 between the tip portions 241c of the second fitting arm portions 241 which faces against each other, even when the second metal terminal portions 240 are in a free state, it is preferably wider than the space W1 from the first side face 20c to second side face 20d of the chip capacitor 20.

As shown in FIG. 24, the second stopper portion 245 is arranged approximately perpendicular to the second fitting arm portion 241 or so, as similar to the first stopper portion 245, and it faces the third side face 20e of the chip capacitor 20 (refer to FIG. 19). At the surface of the second stopper portion 245, the convex and concave shape may be formed as similar to the second fitting arm portion 241. The effect of the second stopper portion 245 is as same as the first stopper portion 235 of the first metal terminal portion 230.

Hereinbelow, the production method of the ceramic capacitor 210 will be described.

The Production Method of the Chip Capacitor 20

The production method of the ceramic capacitor 10 according to the first embodiment has been already described, thus it will be omitted in here.

The Production Method of the First Metal Terminal Portion 230 and the Second Metal Terminal Portion 240

In the production of the first metal terminal portion 230 and the second metal portion terminal portion 240, first the metal board material 280 of the flat plate material as shown in FIG. 27(a) is prepared. The material of the metal board material 280 is not particularly limited as long as it is a metal material having the conductivity, and for example iron, nickel, copper, silver or so, or the alloy including these can be used. Note that, the first metal terminal portion 230 and the second metal terminal portion 240 can be made by the same production method, hence the second metal terminal portion 240 will be used as an example to explain.

Figure 27:
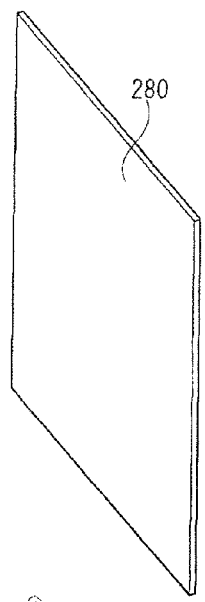
FIG. 27 is a conceptual diagram showing the production method of the second metal terminal portion included in the ceramic electronic component according to the ninth embodiment.
Figure 27:
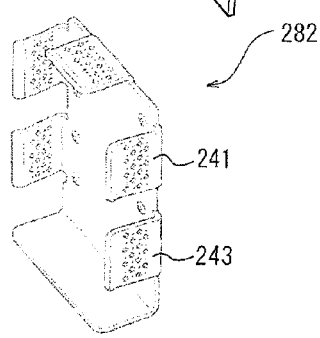
Figure 27:
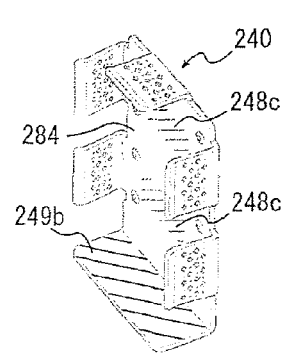
Figure 27:
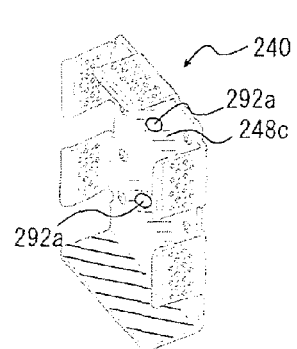

Next, by carrying out the mechanical processing to the metal board material 280, the intermediate part is obtained (FIG. 27(b)). The specific processing method is not particularly limited, and for example by using the press processing, cutting processing or so, the shapes of the second flat plate board 248, the second fitting arm portion 241, 243, the second stopper portion 245, the second mounting portion 249 or so are formed from the metal board material 280. Also, the method of forming the convex and concave shape such as the second inner side convex portion 241aa, 243aa, the second inner side concave portion 241ab, 243ab, the second outer side convex portion 241ba, 243ba, and the second outer side concave portion 241bb, 243bb (refer to FIG. 24) to the second arm inner face 241a, 243a and the second arm outer face 241b, 243b is not particularly limited; however it can be formed by a surface roughening treatment such as sand blasting, chemical etching or so, or the press processing or so. In the embodiment shown in FIG. 27, the part corresponding to the second fitting arm portion which is before the convex and concave being formed, is formed by pressing the metal mold of the convex and the concave shape from the inner face side and the outer face side.

Next, on the surface of the intermediate part 282, the metal coating 284 is formed by the plating, thereby second metal terminal portion 240 is obtained (refer to FIG. 27(C)). As for the material used for the plating, it is not particularly limited, however for example Ni, Sn, Cu or so may be mentioned. Also, when carrying out the plating treatment, by carrying out the resist treatment to the mounting portion upper face 249b of the second mounting portion 249 and the connection portion 248c of the second flat plate portion 248, the plating is prevented from adhering to the mounting portion upper face 249b and the connection portion 248c. Thereby, the wettability of the mounting portion upper face 249b and that of mounting portion bottom face 249a against the solder can be made different, and also the adhesiveness against the connection portion 248c can be made higher than other portions such as the second inner side convex portions 241aa, 243aa or so which is carried out with the metal coating. Note that, after forming the metal coating 284 by carrying out the plating treatment to the entire intermediate parts, the metal coating formed to the mounting portion upper face 249b and the connection portion 248c can be removed by the laser releasing or so, so that the same difference can be made.

The Assembling of the Ceramic Capacitor 210

Two chip capacitors 20 obtained as mentioned in above are prepared, and while holding as shown in FIG. 19, the first metal terminal portion 230 and the second metal terminal portion 240 are respectively attached to the first terminal electrode 22 and the second terminal electrode 24; thereby obtained the ceramic capacitor 210. Before attaching to the chip capacitor 20, as shown in FIG. 27(d), the connection portions 238c, 248c of each metal terminal portions 230, 240 are pasted in advance with the adhesive agent 292a which becomes the first adhesive agent joint portion 290 and the second adhesive agent joint portion 292 after curing. As shown in FIG. 28, the tip (the tip portion 241c) of each fitting arm portion of the metal terminal portions 230 and 240 are bent so that it spaces apart against each other, hence by just brining each end face 20a and 20b of the chip capacitor 20, and the flat plate portion 238 and 248 of the metal terminal portion 230 and 240, the terminal electrode 22 and 24 can be embedded between the pair of the fitting arm portions 231, 233, 241, 243.

In case the adhesive agent 292a is the thermal setting resin, after attaching the first and the second metal terminal portions 230, 240 to the chip capacitor 20, by curing the adhesive agent 292a by carrying out the heat treatment at the predetermined temperature, the first adhesive agent joint portion 290 and the second adhesive agent joint portion 292 are formed. Note that, depending on the needs, the inner side convex portions 231aa, 241aa, 243aa engaging with the terminal electrodes 22, 24 can be welded by melting the metal plating formed on the either one or on the both surface. Thereby, the electrical adhesiveness between the terminal electrode 22, 24 and the metal terminal portions 230, 240 is improved, and the physical bonding between the chip capacitor 20 and the metal terminal portions 230, 240 can be reinforced.

As such, for the ceramic capacity 210, the first and the second metal terminal portions 230, 240 comprises the fitting arm portions 231, 232, 241, 243, and hold the side faces 20c, 20d of the chip capacitor 20 in between. Therefore, the ceramic capacitor 210 can be easily assembled, and the production is easy. Also, even in case of being used at high temperature environment or under the environmental having large temperature change, the ceramic capacitor 210 has no risk of breaking the bonding between the chip capacitor 20 and the metal terminal portions 230, 240, by having the difference between the heat expansion rate of the bonding material and the metal terminal portion 230, 240, unlike the conventional art using the bonding material as the solder or so.

Also, the ceramic capacitor 210 secures the conductivity between the chip capacitor 20 and the metal terminal portions 230, 240 by engaging the terminal electrodes 22, 24 with at least part of the plurality of the inner side convex portions 231aa, 241aa, 243aa formed at the arm inner face 231a, 241a, 243a; hence the production is easy compared to the conventional art which bonds the metal terminal portion and the chip component by the solder or the adhesive agent. Further, on the contrary to the conventional art, there is no need to use the high temperature solder for the bonding of the metal terminal portions 230, 240 and the chip capacitor 20; hence the use of the material having environmental load can be suppressed. Also, plurality of the inner side convex portions 231aa, 241aa, 243aa are formed at the arm inner faces 231a, 241a, 243a, thereby even when the shape of the terminal electrodes 22, 24 of the chip capacitor 20 has production variations, the fitting arm portions 231, 233, 241, 243 can suitably exhibit the force to hold the chip capacitor 20, and also the conductivity can be secured by engaging at least one inner side convex portions 231aa, 241aa, 243aa and the terminal electrodes 22, 24.

The arrangements of the inner side convex portions 231aa, 241aa, 243aa are not particularly limited; however, as shown in FIG. 30, the inner side convex portions 231aa, 241aa, 243aa may constitute the convex alignment portions 242a, 242b, 232a, 232b aligned along the third direction or the fifth direction (Z axis direction). The fitting arm portions 231, 233, 243 formed with the convex alignment portions 242a, 242b, 232a, 232b can securely hold the chip capacitor 20 by allowing plurality of the convex portions 231aa, 241aa, 243aa to contact with the side faces of the chip capacitor 20 at a suitable position. Also, by forming plurality of the convex alignment portions 232a, 242a along the first direction (X axis direction), even in case the amount of the wraparound to the side faces 20c, 20d of the terminal electrodes 22, 24 varies due to the production variety, such fitting arm portions 231, 233, 241, 243 securely hold the chip capacitor 20, and also secures the conductivity by securely engaging at least part of the inner side convex portions 231aa, 241aa, 243aa with the terminal electrodes 22, 24. Further, in case of forming plurality of the convex alignment portions 242a, 242b, 232a, 232b, by forming the inner side convex portions 231aa, 241aa, 243aa by shifting the third direction or the fifth direction, many inner side convex portions 231aa, 241aa, 243aa can be formed particularly at suitable position of the first direction.

Figure 31:
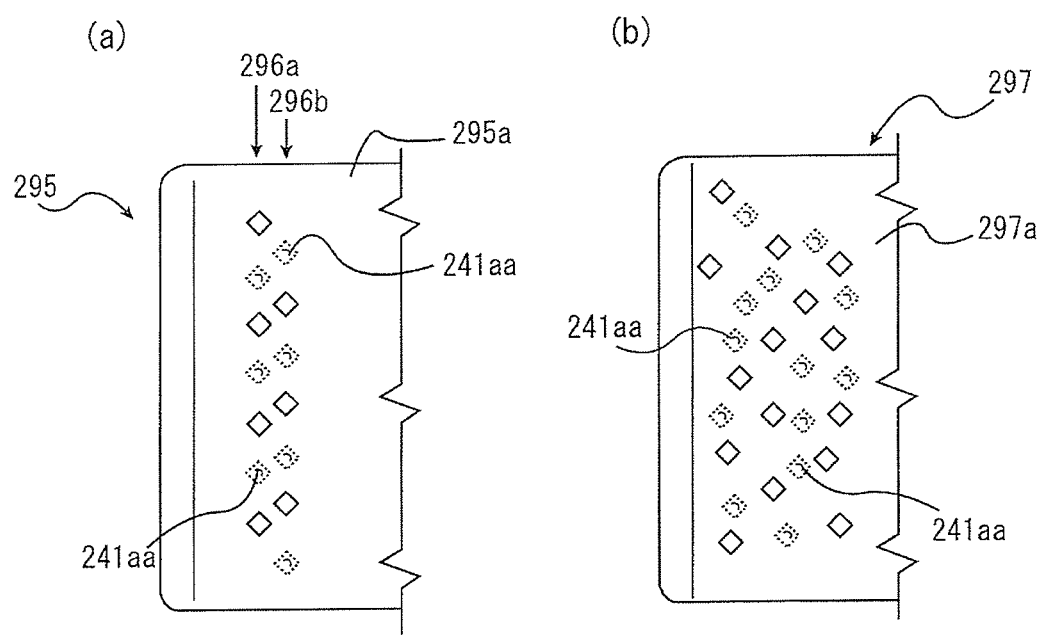
FIG. 31 is a conceptual diagram explaining the arrangement of the inner side convex portion at the fitting arm portion according to the modified example.

The inner side convex portions may be formed periodically at the arm inner face; however, as shown in FIG. 31, the arrangement of the inner convex portion may have irregular spacing which includes plurality of the inner convex portions having different distance to the other closest inner convex portions. FIG. 31(a) is a schematic diagram showing the convex and concave shape of the second arm inner face 295a of the second fitting arm portion 295 according to the first modified example. At the second arm inner face 295a, each one of the second convex alignment portion 296a and the second convex alignment portion 296b are formed, hence total of two rows are formed; and the second inner side convex portions 241aa included in one of the second convex alignment portion 296a, has shifted position of the fifth direction (Z axis direction) with respect to the second inner side convex portion 241aa included in adjacent second convex alignment portions 296b. However, in the first modified example shown in FIG. 31(a), unlike the second arm inner face 241a shown in FIG. 31(a), the second inner side convex portions 241aa are arranged by unequal spacing. Also, at the second arm inner face 297a of the second fitting arm portion 297 according to the second modified example shown in FIG. 31(b), the second inner side convex portion 241aa are arranged randomly.

Note that, by forming the outer side convex portions 241ba, 243ba or the outer portion concave portions 241bb, 243bb not only to the arm inner faces 231a, 241a, 243a of the fitting arm portions 231, 233, 241, 243 but also to the arm outer faces 241b, 243b, the heat dissipation characteristic of the metal terminal portions can be improved and the temperature rising of the chip component can be suppressed.

Also, the adhesive agent joint portions 290, 292 connecting the end faces 20a, 20b of the chip capacitor 20 and the flat plate portion of the metal terminal portions 230, 240 reinforces the mechanical bonding between the chip capacitor 20 and the metal terminal portions 230, 240; and the ceramic capacitor 210 comprising such adhesive agent joint portions 290, 292 has electrically and structurally suitable reliability against deformation force and impact from the outside. Also, the ceramic capacitor 210 can suppress the phenomena of which the vibration caused by the electrostriction generated by the chip capacitor 20 transferring to the mounting substrate via the metal terminal portions 230, 240, compared to the conventional art connecting the chip capacitor and the terminals via solder or so; and can prevent the squealing noise when driving the ceramic capacitor 210.

The Tenth to Fourteenth Embodiments

Figure 25:
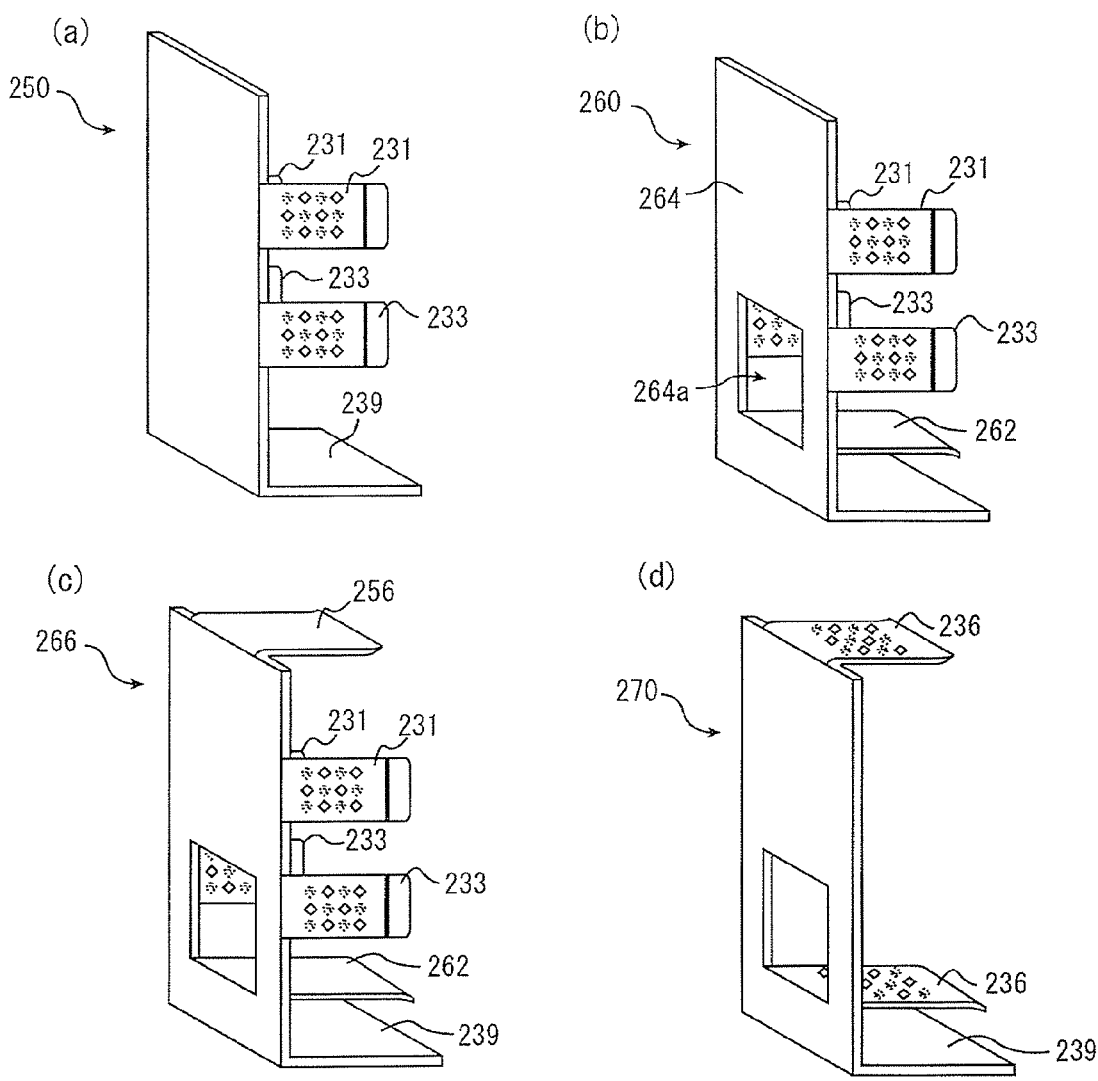
FIG. 25 is a conceptual diagram showing the shape of the first metal terminal portion included in the ceramic electronic component according to the tenth to thirteenth embodiments of the present invention.

The metal terminal attached to the chip capacitor 20 is not limited to the shape shown in the ninth embodiment, and it can be variously modified depending on the use of the ceramic capacitor. FIG. 25 is a conceptual diagram showing the first metal terminal used for the ceramic capacitor according to the tenth to thirteenth embodiments of the present invention. Note that, for the ceramic capacitor according to the tenth to fourteenth embodiments, except for having different arrangements of the fitting arm portions and the stopper portions, those common parts with the ninth embodiment such as the convex and concave shape formed at the fitting arm or so will be omitted from explaining.

FIG. 25(a) shows the first metal terminal portions 250 included in the ceramic capacitor according to the tenth embodiment of the present invention. The first metal terminal portions 250 comprises the first fitting arm portions 231, 233 facing the side faces 20c, 20d arranged approximately perpendicular to the first mounting portion 239, among the side faces of the chip capacitor 20. However, the first metal terminal portions 250 does not comprise the first stopper portion 235 which stop the parallel side face with respect to the first mounting portion 239, unlike the first metal terminal 230 according to the ninth embodiment.

Here, the stacking electronic component such as the chip capacitor 20 tends to easily have the size variations in regards with the stacking direction of the dielectric layer 28 and the inner electrode layer 27 (refer to FIG. 7), and for other directions, it has lesser size variation than the stacking direction. As shown in FIG. 7, in case the stacking direction of the chip capacitor 20 is the perpendicular direction with respect to the first mounting portion 239, as the first metal terminal portion 250 shown in FIG. 25(a), the holding force of the first fitting arm portions 231, 233 can be stabilized than holding the chip capacitor 20 from the horizontal direction with respect to the first mounting portions 239.

The first metal terminal portions 250 shown in FIG. 25(a) also can hold the chip capacitor 20 stably by controlling the thickness or so of the metal board plate 280 (refer to FIG. 27) used for the production; and will exhibit the same effect as the first terminal electrode 230 according to the ninth embodiment. Also, the first metal terminal portion 250 has lesser contact points with the chip capacitor 20 than the first metal terminal portion 230 according to the ninth embodiment; hence it is advantageous from the point of the prevention of the squealing noise.

FIG. 25(b) shows the first metal terminal portion 260 included in the ceramic capacitor according to the eleventh embodiment of the present invention. The first metal terminal portion 260 is different from the first metal terminal portion 250 shown in FIG. 25(a) in terms of having the first stopper portion 262, however it is the same as the first metal terminal portion 250 for the rest of other constitutions. The stopper portion 262 is arranged approximately perpendicular to the first fitting arm portions 231, 233, and faces the fourth side face 20f which faces the first mounting portion 239 side, among the side faces of the chip capacitor 20.

At the first flat plate portion 264 of the first metal terminal portion 260, the first through hole 264a is formed, and the first stopper portion 262 is connected to the first flat plate portion 264 at the edge portion of the first through hole 264a. The first metal terminal portion 260 comprising such stopper portion 262 can be produced easily by simply processing the metal board 280 shown in FIG. 27. Also, at the stopper portion 262, there is no convex and concave formed. However, the first stopper portion 262 is not only useful for the positioning when assembling, but also the ceramic capacitor comprising the first metal terminal portion 260 has excellent durability since the chip capacitor 20 after assembling can be supported against the gravity direction. Note that, in case of the first metal terminal portion 260, the constitution corresponding to the first adhesive agent joint portion 290 of the ninth embodiment is formed so that the peripheral portion of the first through hole 264a of the first flat plate 264, and the first end face of the chip capacitor which faces thereto can be connected. Also, the second metal terminal used as a pair of the first metal terminal portion 260 comprises the second stopper portion and the second flat plate portion formed with the second through hole, as similar to the first metal terminal portion 260.

FIG. 27(C) shows the first metal terminal portion 266 included in the ceramic capacitor according to the twelfth embodiment of the present invention. The first metal terminal portion 266 is different from the first metal terminal portion 250 shown in FIG. 27(a) in terms of comprising the first stopper portion 256 and the first stopper portion 262; however for rest of the constitutions, it is the same as the first metal terminal portion 250. As such, the first metal terminal portion 266 may comprise a pair of the first stopper portions 256, 262 which faces against each other, and the ceramic a capacitor comprising such first metal terminal portion 266 has excellent assembling property and the durability.

FIG. 27(d) shows the first metal terminal portions 270 included in the ceramic capacitor according to the thirteenth embodiment of the present invention. The first metal terminal portion 270 comprises the first fitting arm portion 236 which faces the side faces 20c, 20d arranged approximately parallel to the first mounting portion 239, among the side faces of the chip capacitor 20. However, the first metal terminal portion 270 does not comprise the fitting arm portion which holds the side face perpendicular to the first mounting portion 239, unlike the first metal terminal portion 230 according to the ninth embodiment.

Unlike the chip capacitor 20 shown in FIG. 7, in case the stacking direction of the chip capacitor is the direction parallel to the first mounting embodiment 239, the holding force of the first fitting arm portion can be stabilized since the size variation of the chip capacitor 20 is lesser by holding the chip capacitor from the perpendicular direction with respect to the first mounting portion 239.

Figure 26:
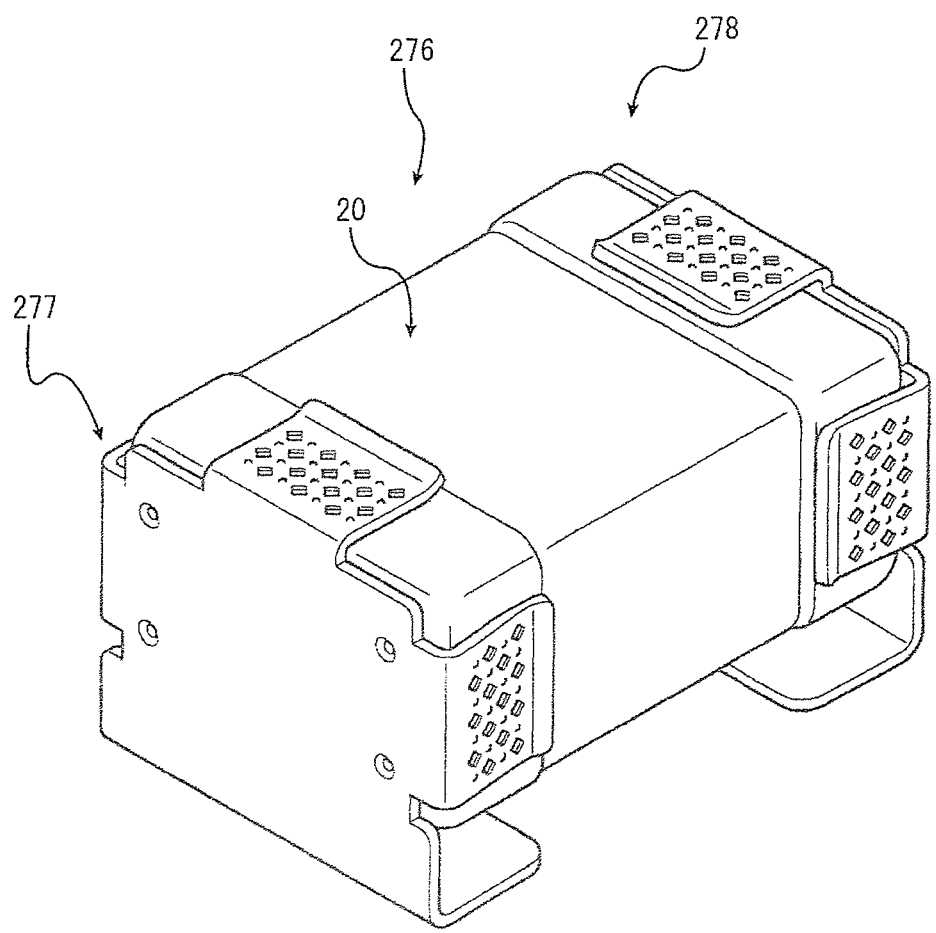
FIG. 26 is a perspective view of the ceramic electronic component according to the fourteenth embodiment of the present invention.
Figure 33:
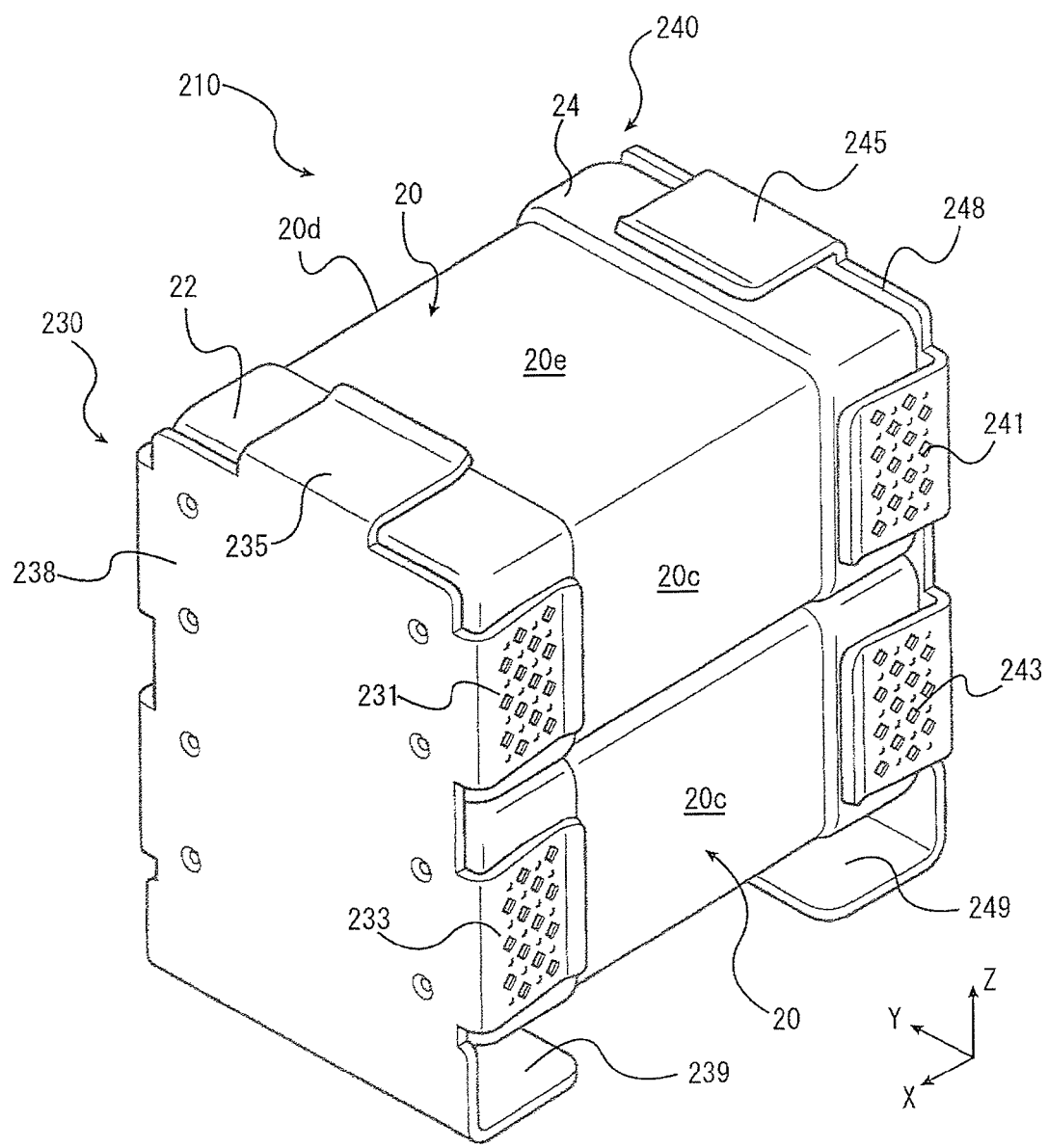
FIG. 33 is a schematic perspective view showing the ceramic electronic component according to the modified example of the ninth embodiment.

FIG. 26 is a perspective view of the ceramic capacitor 276 according to the fourteenth embodiment of the present invention. The ceramic capacitor 276 comprises one chip component, the first metal terminal electrode 277, the second metal terminal electrode 278. As shown in FIG. 26, the number of the chip capacitor 20 included in the ceramic capacitor 276 may be one, or it may be three or more. The ceramic capacitor 276 exhibits the same effect as the ceramic capacitor 210 according to the ninth embodiment. Note that, in the ceramic capacitor 200, 276 according to the ninth and the fourteenth embodiment, the same convex and concave as the inner side convex portion 242aa and the inner side concave portion 241ab of the fitting arm portions 231a, 241a are formed at the stopper portions 235, 245; however as shown in FIG. 33, the convex and concave may not be formed at the stopper portion 235, 245.

The invention claimed is:

1. A ceramic electronic component comprising;
a chip component of approximately rectangular parallelepiped shape having a first terminal electrode formed so that it wraps around a part of side faces from a first end face, and a second terminal electrode formed so that it wraps around other part of said side faces from a second end face opposing said first end face,
a first metal terminal portion having a first flat plate portion facing said first end face, at least a pair of first fitting arm portions connected to said first flat plate portion, formed with a first engagement projection engaging with a first wraparound portion which is a part of said first terminal electrode and positioned at said side face of said chip component, and a pair of said first fitting arm portions holding said first wraparound portion in between, and a first mounting portion connected to said first flat plate portion and extending approximately parallel to either one of said side face by taking predetermined space in between said chip component, and
a second metal terminal portion having a second flat plate portion facing said second end face, at least a pair of second fitting arm portions connected to said second flat plate portion, formed with a second engagement projection engaging with a second wraparound portion which is a part of said second terminal electrode and positioned at said side face of said chip component, and a pair of said second fitting arm portions holding said second wraparound portion in between, and a second mounting portion connected to said second flat plate portion and extending approximately parallel to either one of said side face by taking predetermined space in between said chip component.

2. The ceramic electronic component as set forth in claim 1 wherein said first fitting arm portion is facing one of said side face of said chip component, wherein said side face is positioned approximately perpendicular to said first mounting portion, and
said second fitting arm portion is facing one of said side face of said chip component, wherein said side face is positioned approximately perpendicular to said second mounting portion.

3. The ceramic electronic component as set forth in claim 1 wherein said first fitting arm portion is facing one of said side face of said chip component, wherein said side face is approximately parallel against said first mounting portion, and
said second fitting arm portion is facing one of said side face of said chip component, wherein said side face is approximately parallel against said second mounting portion.

4. The ceramic electronic component as set forth in claim 1 comprising
at least two pairs of said first fitting arm portions wherein one pair of said two pairs of said first fitting arm portions is facing one of said side face of said chip component, wherein said side face is positioned approximately perpendicular to said first mounting portion, and another pair of said first fitting arm portions is facing one of said side face of said chip component, wherein said side face is positioned approximately parallel against said first mounting portion, and
at least two pairs of said second fitting arm portions wherein one pair of said two pairs of said second fitting arm portions is facing one of said side face of said chip component, wherein said side face is positioned approximately perpendicular to said second mounting portion, and another pair of said second fitting arm portion is facing one of said side face of said chip component, wherein said side face is positioned approximately parallel against said second mounting portion.

5. The ceramic electronic component as set forth in claim 1 wherein said first engagement projection has higher projection height or wider projection width towards said first flat plate portion from a projection end portion of said first engagement projection, and
a second engagement projection has higher projection height or wider projection width towards said second flat plate portion from a projection end portion of said second engagement projection.

6. The ceramic electronic component as set forth in claim 1 wherein said first terminal electrode and said second terminal electrode of said chip component has a metal plating layer coating the surface.

7. The ceramic electronic component as set forth in claim 1 wherein said first engagement projection of said first fitting arm portion and said second engagement projection of said second fitting arm portion has a metal plating layer coating an outer most surface.

8. The ceramic electronic component as set forth in claim 7 wherein said first wraparound portion and said first engagement projection, and said second wraparound portion and said second engagement projection is weld via said metal plating layer.

9. The ceramic electronic component as set forth in claim 1 wherein a main component of a material of said first metal terminal portion and said second metal terminal portion is phosphor bronze.

10. The ceramic electronic component as set forth in claim 1 wherein at said first flat plate portion, a first projection portion is formed which is in contact with said first end face by projecting out towards said first end face, and
at a second flat plate portion, a second projection portion is formed which is in contact with said second end face by projecting out towards said second end face.

11. The ceramic electronic component as set forth in claim 1 comprising
a first stopper portion which is connected to said first flat plate portion, positioned approximately perpendicular to said first fitting arm portion and in contact with one of said side face of said chip component, and
a second stopper portion which is connected to said second flat plate portion, positioned approximately perpendicular to said second fitting arm portion and in contact with one of said side face of said chip component.

12. A ceramic electronic component comprising;
a chip component of approximately rectangular parallelepiped shape having a first terminal electrode formed so that it wraps around a part of side faces from a first end face, and a second terminal electrode formed so that it wraps around other part of said side faces from a second end face opposing said first end face, a first metal terminal portion having a first flat plate portion facing said first end face, at least a pair of first fitting arm portions connected to said first flat plate portion, formed with a first engagement projection engaging with a first wraparound portion which is a part of said first terminal electrode and positioned at said side face of said chip component, a pair of said fitting arm portion holding said first wraparound portion in between, and a first mounting portion connected to said first flat plate portion and extending approximately parallel to either one of said side face by taking predetermined space in between said chip component, a first adhesive agent joint portion connecting said first flat plate portion and said first end face, a second metal terminal portion having a second flat plate portion facing said second end face, at least a pair of second fitting arm portions connected to said second flat plate portion, formed with a second engagement projection engaging with a second wraparound portion which is a part of said second terminal electrode and positioned at said side face of said chip component, and a pair of said second fitting arm portion holding said second wraparound portion in between, and a second mounting portion connected to said second flat plate portion and extending approximately parallel to either one of said side face by taking predetermined space in between said chip component, and a second adhesive agent joint portion connecting said second flat plate portion and said second end face.

13. The ceramic electronic component as set forth in claim 12 wherein an adhesive agent constituting said first adhesive agent joint portion and said second adhesive agent joint portion is made of non-conductive adhesive agent.

14. The ceramic electronic component as set forth in claim 12 where in at a connection part of said first flat plate portion with said first adhesive agent joint portion and the connection part of said second flat plate portion with said second adhesive agent joint portion, an area having higher adhesiveness against the adhesive agent constituting said first adhesive agent joint portion and said second adhesive agent joint portion than a metal plating layer provided to said first fitting arm portion and said second fitting arm portion are formed.

15. A ceramic electronic component comprising;
a chip component of approximately rectangular parallelepiped shape having a first terminal electrode formed so that it wraps around a part of side faces from a first end face, and a second terminal electrode formed so that it wraps around other part of said side faces from a second end face which is opposing said first end face,
a first metal terminal portion having a first flat plate portion facing said first end face, at least a pair of first fitting arm portions connected to said first flat plate portion and a pair of said first fitting arm portion holding a pair of said side faces of said chip component in between, and a first mounting portion connected to said first flat plate portion and extending approximately parallel to either one of said side face by taking predetermined space in between said chip component,
a second metal terminal portion having a second flat plate portion facing said second end face, at least a pair of second fitting arm portions connected to said second flat plate portion and a pair of said second fitting arm portion holding a pair of said side faces of said chip component in between, and a second mounting portion connected to said second flat plate portion and extending approximately parallel to either one of said side face by taking predetermined space in between said chip component, wherein plurality of first inner convex portions projecting out towards said chip component is formed at a first arm inner side which is a face facing said chip component in said first fitting arm portion and at least a part of said first inner convex portions is engaging with said first terminal electrode, and plurality of second inner convex portions projecting out towards said chip component is formed at a second arm inner side which is a face facing said chip component in said first fitting arm portion and at least a part of said second inner convex portions is engaging with said second terminal electrode.

16. The ceramic electronic component as set forth in claim 15 comprising
a first adhesive agent joint portion connecting said first flat plate portion and said first end face, and
a second adhesive agent joint portion connecting said second flat plate portion and said second end face.

17. The ceramic electronic component as set forth in claim 15 wherein plurality of first outer convex portions projecting out towards an opposite direction against said chip component are formed at a first arm outer side opposing said first arm inner side of said first fitting arm portion, and
plurality of second outer convex portions projecting out towards an opposite direction against said chip component are formed at a second arm outer side opposing said second arm inner side of said second fitting arm portion.

18. The ceramic electronic component as set forth in claim 15 wherein a first convex alignment portion is formed, which is constituted by plurality of said first inner convex portions, by aligning along a third direction being the perpendicular direction to a first direction which is a direction towards said second end face from said first end face, and to a second direction which is a sandwiching direction of said first fitting arm portion, and
a second convex alignment portion is formed, which is constituted by plurality of said second inner convex portion, by aligning along a fifth direction being a perpendicular direction to said first direction and a fourth direction which is a sandwiching direction of said second fitting arm portion.

19. The ceramic electronic component as set forth in claim 18 wherein plurality of said first convex alignment portions are formed at said first arm inner side along said first direction, and
plurality of said second convex alignment portions are formed at said second arm inner side along said first direction.

20. The ceramic electronic component as set forth in claim 19 wherein one of said first inner convex portions included in said first convex alignment portions has different position of said third direction with respect to other said first inner convex portions included in adjacent said first convex alignment portions, and
said second inner convex portions included in said second convex alignment portions has different position of said fifth direction with respect to said second inner convex portions included in adjacent said second convex alignment portion.

21. The ceramic electronic component as set forth in claim 15 wherein plurality of said first inner convex portion is formed at said first arm inner side having different distance to closest other said first inner convex portion, and plurality of said second inner convex portion is formed at said second arm inner side having different distance to closest other said second inner convex portion.

\* \* \* \* \*

UNITED STATES PATENT AND TRADEMARK OFFICE
CERTIFICATE OF CORRECTION

Page 1 of 1

PATENT NO.          : 9,042,079 B2
APPLICATION NO.     : 13/973514
DATED               : May 26, 2015
INVENTOR(S)         : Sunao Masuda et al.

It is certified that error appears in the above-identified patent and that said Letters Patent is hereby corrected as shown below:

Please correct the title page item (30), by inserting the following under Foreign Application Priority Data:

-- Aug. 24, 2012   (JP) ...................................... 2012-184853 --.

Signed and Sealed this
Twenty-second Day of September, 2015

Michelle K. Lee
*Director of the United States Patent and Trademark Office*